(12) United States Patent
Agrafiotis et al.

(10) Patent No.: US 7,039,621 B2
(45) Date of Patent: May 2, 2006

(54) SYSTEM, METHOD, AND COMPUTER PROGRAM PRODUCT FOR REPRESENTING OBJECT RELATIONSHIPS IN A MULTIDIMENSIONAL SPACE

(75) Inventors: Dimitris K. Agrafiotis, Downington, PA (US); Dmitri N. Rassokhin, Exton, PA (US); Victor S. Lobanov, North Brunswick, NJ (US); F. Raymond Salemme, Yardley, PA (US)

(73) Assignee: Johnson & Johnson Pharmaceutical Research & Development, L.L.C., Raritan, NJ (US)

( * ) Notice: Subject to any disclaimer, the term of this patent is extended or adjusted under 35 U.S.C. 154(b) by 584 days.

(21) Appl. No.: 09/814,160

(22) Filed: Mar. 22, 2001

(65) Prior Publication Data

US 2002/0091655 A1    Jul. 11, 2002

Related U.S. Application Data

(60) Provisional application No. 60/191,108, filed on Mar. 22, 2000.

(51) Int. Cl.
G06E 1/00     (2006.01)
(52) U.S. Cl. ............................................. 706/20; 706/15
(58) Field of Classification Search .................... 706/2, 706/6, 14, 15–18, 20, 48, 62; 382/224–225
See application file for complete search history.

(56) References Cited

U.S. PATENT DOCUMENTS

| | | | |
|---|---|---|---|
| 4,773,099 A | 9/1988 | Bokser | 382/14 |
| 4,811,217 A | 3/1989 | Tokizane et al. | 364/300 |
| 4,859,736 A | 8/1989 | Rink | 525/54.1 |
| 4,908,773 A | 3/1990 | Pantoliano et al. | 364/496 |
| 4,935,875 A | 6/1990 | Shah et al. | 364/497 |
| 4,939,666 A | 7/1990 | Hardman | 364/496 |
| 5,010,175 A | 4/1991 | Rutter et al. | 530/334 |
| 5,025,388 A | 6/1991 | Cramer, III et al. | 364/496 |

(Continued)

FOREIGN PATENT DOCUMENTS

EP    0 355 266 B1    2/1990

(Continued)

OTHER PUBLICATIONS

Borg, Ingwer and Groenen, Patrick, *Modern Multidimensional Scaling Theory and Applications*, Springer Series in Statistics, 1997, entire book submitted.

(Continued)

*Primary Examiner*—Antony Nguyen-Ba
(74) *Attorney, Agent, or Firm*—Wilson, Sonsini, Goodrich & Rosati

(57) ABSTRACT

A method and computer product is presented for mapping n-dimensional input patterns into an m-dimensional space so as to preserve relationships that may exist in the n-dimensional space. A subset of the input patterns is chosen and mapped into the m-dimensional space using an iterative nonlinear mapping process. A set of locally defined neural networks is created, then trained in accordance with the mapping produced by the iterative process. Additional input patterns not in the subset are mapped into the m-dimensional space by using one of the local neural networks. In an alternative embodiment, the local neural networks are only used after training and use of a global neural network. The global neural network is trained in accordance with the mapping produced by the iterative process. Input patterns are initially projected into the m-dimensional space using the global neural network. Local neural networks are then used to refine the results of the global network.

12 Claims, 11 Drawing Sheets

U.S. PATENT DOCUMENTS

| | | | |
|---|---|---|---|
| 5,095,443 A | 3/1992 | Watanabe | 395/11 |
| 5,155,801 A | 10/1992 | Lincoln | 395/22 |
| 5,167,009 A | 11/1992 | Skeirik | 395/27 |
| 5,181,259 A | 1/1993 | Rorvig | 382/36 |
| 5,240,680 A | 8/1993 | Zuckermann et al. | 422/67 |
| 5,260,882 A | 11/1993 | Blanco et al. | 364/499 |
| 5,265,030 A | 11/1993 | Skolnick et al. | 364/496 |
| 5,270,170 A | 12/1993 | Schatz et al. | 435/7.37 |
| 5,276,771 A * | 1/1994 | Manukian et al. | 706/25 |
| 5,288,514 A | 2/1994 | Ellman | 427/2 |
| 5,307,287 A | 4/1994 | Cramer, III et al. | 364/496 |
| 5,323,471 A | 6/1994 | Hayashi | 382/15 |
| 5,331,573 A | 7/1994 | Balaji et al. | 364/500 |
| 5,434,796 A | 7/1995 | Weininger | 364/496 |
| 5,436,850 A | 7/1995 | Eisenberg et al. | 364/496 |
| 5,442,122 A | 8/1995 | Noda et al. | 564/426 |
| 5,461,697 A * | 10/1995 | Nishimura et al. | 704/232 |
| 5,463,564 A | 10/1995 | Agrafiotis et al. | 364/496 |
| 5,499,193 A | 3/1996 | Sugawara et al. | 364/500 |
| 5,519,635 A | 5/1996 | Miyake et al. | 364/497 |
| 5,524,065 A | 6/1996 | Yagasaki | 382/226 |
| 5,526,281 A | 6/1996 | Chapman et al. | 364/496 |
| 5,545,568 A | 8/1996 | Ellman | 436/518 |
| 5,549,974 A | 8/1996 | Holmes | 428/403 |
| 5,553,225 A | 9/1996 | Perry | 395/157 |
| 5,565,325 A | 10/1996 | Blake | 435/7.1 |
| 5,574,656 A | 11/1996 | Agrafiotis et al. | 364/500 |
| 5,585,277 A | 12/1996 | Bowie et al. | 436/518 |
| 5,602,755 A | 2/1997 | Ashe et al. | 364/498 |
| 5,602,938 A | 2/1997 | Akiyama et al. | 382/155 |
| 5,612,895 A | 3/1997 | Balaji et al. | 364/496 |
| 5,621,861 A | 4/1997 | Hayashi et al. | 395/23 |
| 5,634,017 A | 5/1997 | Mohanty et al. | 395/326 |
| 5,635,598 A | 6/1997 | Lebl et al. | 530/334 |
| 5,670,326 A | 9/1997 | Beutel | 435/7.1 |
| 5,679,582 A | 10/1997 | Bowie et al. | 436/518 |
| 5,684,711 A | 11/1997 | Agrafiotis et al. | 364/500 |
| 5,703,792 A | 12/1997 | Chapman | 364/496 |
| 5,712,171 A | 1/1998 | Zambias et al. | 436/518 |
| 5,712,564 A | 1/1998 | Hayosh | 324/210 |
| 5,729,662 A * | 3/1998 | Rozmus | 706/20 |
| 5,734,796 A * | 3/1998 | Pao | 706/16 |
| 5,736,412 A | 4/1998 | Zambias et al. | 436/518 |
| 5,740,326 A | 4/1998 | Boulet et al. | 395/27 |
| 5,789,160 A | 8/1998 | Eaton et al. | 435/6 |
| 5,807,754 A | 9/1998 | Zambias et al. | 436/518 |
| 5,811,241 A | 9/1998 | Goodfellow et al. | 435/7.1 |
| 5,832,494 A | 11/1998 | Egger et al. | 707/102 |
| 5,858,660 A | 1/1999 | Eaton et al. | 435/6 |
| 5,861,532 A | 1/1999 | Brown et al. | 564/142 |
| 5,866,334 A | 2/1999 | Beutel | 435/6 |
| 5,901,069 A | 5/1999 | Agrafiotis et al. | 364/528.03 |
| 5,908,960 A | 6/1999 | Newlander | 564/177 |
| 5,933,819 A | 8/1999 | Skolnick et al. | 706/21 |
| 6,014,661 A | 1/2000 | Ahlberg et al. | 707/3 |
| 6,037,135 A | 3/2000 | Kubo et al. | 435/7.24 |
| 6,049,797 A | 4/2000 | Guha et al. | 707/6 |
| 6,134,537 A * | 10/2000 | Pao et al. | 706/16 |
| 6,185,506 B1 | 2/2001 | Cramer et al. | 702/19 |
| 6,192,351 B1 * | 2/2001 | Persaud | 706/2 |

FOREIGN PATENT DOCUMENTS

| | | |
|---|---|---|
| EP | 0 355 628 B1 | 2/1990 |
| EP | 0 770 876 A1 | 5/1997 |
| EP | 0 818 744 A2 | 1/1998 |
| WO | WO 91/19735 | 12/1991 |
| WO | WO 92/00091 | 1/1992 |
| WO | WO 93/20242 | 10/1993 |
| WO | WO 94/28504 | 12/1994 |
| WO | WO 95/01606 | 1/1995 |
| WO | WO 97/09342 | 3/1997 |
| WO | WO 97/20952 | 6/1997 |
| WO | WO 97/27559 | 7/1997 |
| WO | WO 98/20437 | 5/1998 |
| WO | WO 98/20459 | 5/1998 |

OTHER PUBLICATIONS

Agrafiotis, D.K. et al., "Advances in diversity profiling and combinatorial series design," *Molecular Diversity*, Kluwer Academic Publishers, vol. 4, 1999, pp. 1-22.

Agrafiotis, D.K. and Lobanov, V.S., "An Efficient Implementation of Distance-Based Diversity Measures Based on k-d Trees," *J. Chem. Inf. Comput. Sci.*, American Chemical Society, vol. 39, No. 1, Jan./Feb. 1999, pp. 51-58.

Agrafiotis, D.K. and Lobanov, V.S., "Bridging The Gap Between Diversity And QSAR," *Abstracts of Papers Part 1: 215th ACS National Meeting*, Mar. 29-Apr. 2, 1998, p. 181-COMP.

Agrafiotis, D.K. and Jaeger, E.P., "Directed Diversity®: An Operating System For Combinatorial Chemistry," *Abstracts of Papers Part 1: 211th ACS National Meeting*, Mar. 24-28, 1996, p. 46-COMP.

Agrafiotis, D.K., "Diversity of Chemical Libraries," *Encyclopedia of Computational Chemistry*, John Wiley & Sons Ltd, vol. 1:A-D, 1998, pp. 742-761.

Agrafiotis, D.K., "On the Use of Information Theory for Assessing Molecular Diversity," *Journal of Chemistry Information and Computer Sciences*, American Chemical Society, vol. 37, No. 3, May/Jun. 1997, pp. 576-580.

Agrafiotis, D.K. et al., "Parallel QSAR", *Abstracts of Papers Part 1: 217th ACS National Meeting*, Mar. 21-25, 1999, p. 50-COMP.

Agrafiotis, D.K. et al., "PRODEN: A New Program for Calculating Integrated Projected Populations," *Journal of Computational Chemistry*, John Wiley & sons, Inc., vol. 11, No. 9, Oct. 1990, pp. 1101-1110.

Agrafiotis, D.K. and Jaeger, E.P., "Stochastic Algorithms for Exploring Molecular Diversity." *Abstracts of Papers Part 1: 213th ACS National Meeting*, APr. 13-17, 1997, p. 16-CINF.

Agrafiotis, D., "Theoretical Aspects of the Complex: Arts and New Technologies," *Applications and Impacts Information Processing '94*, North-Holland, vol. II, 1994, pp. 714-719.

Biswas, G. et al., "Evaluation of Projection Algorithms," *IEEE Transactions On Pattern Analysis And Machine Intelligence*, IEEE Computer Society, vol. PAMI-3, No. 6, Nov. 1981, pp. 701-708.

Bonchev, D. and Trinajstić, N., "Information theory, distance matrix, and molecular branching," *The Journal of Chemical Physics*, American Institute of Physics, vol. 67, No. 10, Nov. 15, 1977, pp. 4517-4533.

Chang, C.L. and Lee, R.C.T., "A Heuristic Relaxation Method for Nonlinear Mapping in Cluster Analysis," *IEEE Transactions on Systems, Man, and Cybernetics*, IEEE Systems, MAn, and Cybernetics Society, vol. SMC-3, Mar. 1973, pp. 197-200.

Cramer, R.D. et al., "Virtual Compound Libraries: A New Approach to Decision Making in Molecular Discovery Research," *Journal of Chemical Information and Computer Science*, American Chemical Society, vol. 38, No. 6, Nov./Dec. 1998, pp. 1010-1023.

DeMers, D. and Cottrell, G., "Non-Linear Dimensionality Reduction," *Advances in Neural Information Processing Systems*, vol. 5, 1993, pp. 580-587.

Frey, P.W. and Slate, D.J., "Letter Recognition Using Holland-Style Adaptive Classifiers," *Machine Learning*, Kluwer Academic Publishers, vol. 6, 1991, pp. 161-182.

Friedman, J.H., "Exploratory Projection Pursuit," *Journal of the American Statistical Association*, American Statistical Association, vol. 82, No. 397, Mar. 1987, pp. 249-266.

Friedman J.H. and Turkey, J.W., "A Projection Pursuit Algorithm for Exploratory Data Analysis," *IEEE Transactions on Computers*, IEEE Computer Society, vol. C-23, No. 9, Sep. 1974, pp. 881-889.

Garrido, L. et al., "Use of Multilayer Feedforward Neural Nets As A Display Method for Multidimensional Distributions," *International Journal of Neural Systems*, World Scientific Publishing Co. Pte. Ltd., vol. 6, No. 3, Sep. 1995, pp. 273-282.

Ghose, A.K. et al., "Prediction of Hydrophobic (Lipophilic) Properties of Small Organic Molecules Using Fragmental Methods: An Analysis of ALOGP and CLOGP Methods," *Journal of Physical Chemistry*, American Chemical Society, vol. 102, No. 21, Mat 21, 1998, pp. 3762-3772.

Hall, L.H. and Kier, L.B., "The Molecular Connectivity Chi Indexes and Kappa Shape Indexes in Structure- Property Modeling," *Reviews in Computational Chemistry: Advances*, VCH Publishers, Inc., 1991, pp. 367-422.

Hecht-Nielsen, R., "Replicator Neural Networks for Universal Optimal Source Coding," *Science*, American Association for the Advancement of Science, vol. 269, Sep. 29, 1995, pp. 1860-1863.

Hotelling, H., "Analysis of a Complex of Statistical Variables into Principal Components," *The Journal of Educational Phsychology*, Warwick and York, Inc., vol. XXIV, No. 6, Sep. 1933, pp. 417-441.

Hotelling, H., "Analysis of a Complex of Statistical Variables into Principal Components," *The Journal of Educational Psychology*, Warwick and York, Inc., vol. XXIV, No. 7, Oct. 1933, pp. 498-520.

Lee, R.C.T. et al., "A Triangulation MEthod for the Sequential Mapping of Points from *N*-Space to Two-Space," *IEEE Transactions on Computers*, The Institute of Electrical and Electronics Engineers, Mar. 1977, pp. 288-292.

Lipinski, C.A. et al., "Experimental and computational approaches to estimate solubility and permeability in drug discovery and development settings," *Advanced Drug Delivery Reviews*, Elsevier Science B.V., vol. 23, 1997, pp. 3-25.

Lobanov, V.S. and Agrafiotis, D.K., "Intelligent Database Mining Techniques," *Abstracts of Papers Part 1: 215th ACS National Meeting*, Mar. 29-Apr. 2, 1998, p. 19-COMP.

Lobanov, V.S. et al., "National Selections from Virtual Libraries," *Abstracts of Papers Part 1: 217th ACS National Meeting*, Mar. 21-25, 1999, p. 181-COMP.

Mao, J. and Jain, A.K., "Artificial Neural Networks for Feature Extraction and Multivariate Data Projection," *IEEE transactions on Neural Networks*, IEEE Neural Networks, vol. 6, No. 2, Mar. 1995, pp. 296-317.

Oja, E., "Principal Components, Minor Components, and Linear Neural Networks," *Neural Networks*, Pergamon Press Ltd., vol. 5, 1992, pp. 927-935.

Patterson, D.E. et al., "Neighborhood Behavior: A Useful Concept for Validation of 'Molecular Diversity' Descriptors," *Journal of Medicinal Chemistry*, American Chemical Society, vol. 39, No. 16, 1996, pp. 3049-3059.

Lykett, C.E., "Imrpoving the Efficiency of Sammon's Nonlinear Mapping by Using Clustering Archetypes," *Electronics Letters*, The Institute of Electrical Engineers, vol. 14, No. 25, Dec. 7, 1978, pp. 799-800.

Rubner, J. and Tavan, P., "A Self-Organizing Network for Principal-Component Analysis," *Europhysics Letters*, European Physical Society, vol. 10, No. 7, Dec. 1, 1989, pp. 693-698.

Sadowski, J. et al., "Assessing Similarity and Diversity of Combinatorial Libraries by Spatial Autocorrelation Functions and Neural Networks," *Angewandte Chemie*, VCH, vol. 34, No .23/24, Jan. 5, 1996, pp. 2674-2677.

Thompson, L.A. and Ellman, J.A., "Synthesis and Applications of Small Molecule Libraries," *Chemical Reviews*, American Chemical Society, vol. 96, No. 1, Jan./Feb. 1996, pp. 555-600.

Barnard, John M. and Downs, Geoff M., "Computer representation and manipulation of combinatorial libraries," *Perspectives in Drug Discovery and Design*, Kluwer Academic Publishers, 1997, pp. 13-30.

Brint, Andrew T. and Willett, Peter, "Upperbound procedures for the identification of similar three-dimensional chemical structures," *Journal of Computer-Aided Molecular Design*, ESCOM Science Publishers B.V., vol. 2, No. 4, Jan. 1989, pp. 311-320.

Brown, Robert D. and Martin, Yvonne C., "Designing Combinatorial Library Mixtures Using a Genetic Algorithm," *Journal of Medicinal Chemistry*, American Chemical Society, vol. 40, No. 15, 1997, pp. 2304-2313.

Gillet, Valerie J. et al., "The Effectiveness of Reactant Pools for Generating Structurally-Diverse Combinatorial Libraries," *Journal of Chemical Information Computer Sciences*, American Chemical Society, vol. 37, No. 4, 1997, pp. 731-740.

Gillet, Valerie J. et al., "Selecting Combinatorial Libraries to Optimize Diversity and Physical Properties," *Journal of Chemical Information Computer Sciences*, American Chemical Society, vol. 39, No. 1, 1999, pp. 169-177.

Kearsley, Simon K. et al., "Chemical Similarity Using Physiochemical Property Descriptors," *Journal of Chemical Information Computer Science*, American Chemical Society, vol. 36, No .1 , 1996, pp. 118-127.

Leland, Burton A. et al., "Managing the Combinatorial Explosion," *Journal of Chemical Information Computer Science*, American Chemical Society, vol. 37, No. 1, 1997, pp. 62-70.

Lewis, Richard A. et al., "Similarity Measures for Rational Set Selection and Analysis of Combinatorial Libraries: The Diverse Property-Derived (DPD) Approach," *Journal of Chemical Information Computer Sciences*, American Chemical Society, vol. 37, No. 3, 1997, pp. 599-614.

Martin, Eric J. and Critchlow, Roger E., "Beyond Mere Diversity: Tailoring Combinatorial Libraries for Drug Discovery," *Journal of Combinatorial Chemistry*, American Chemical Society, vol. 1, No. 1, 1999, pp. 32-45.

Sheridan, Robert P. et al., "Chemical Similarity Using Geometric Atom Pair Descriptors," *Journal of Chemical Information Computer Sciences*, Americna Chemical Society, vol. 36, no. 1, 1996, pp. 128-136.

Willett, Peter et al., "Chemical Similarity Searching," *Journal of Chemical Information Computer Sciences*, Americna Chemical Society, vol. 38, No. 6, 1998, pp. 983-996.

Agrafiotis, Dimitris K. and Lobanov, Victor S., "Ultrafast Algorithm for Designing Focused Combinational Arrays," *J. Chem. Inf. Comput. Sci.*, American Chemical Society, 2000, vol. 40, No. 4, pp. 1030-1038.

Ajay et al., "Can We Learn To Distinguish between 'Drug-Like' Molecules?" *Journal of Medicinal Chemistry*, 1998, American Chemical Society, vol. 41, No. 18, pp. 3314-3324.

English-language Abstract of European Patent No. 0 355 628, printed from Dialog File No. 351(Feb., 1990—Date of publication of application).

Brown, Robert D. and Martin, Yvonne C., "the Information Content of 2D and 3D Structural Descriptors Relevant to Ligand-Receptor Binding," *Journal of Chemical Information and Computer Sciences*, American Chemical Society, 1997, vol. 37, No. 1, pp. 1-9.

Brown, Robert D. and Martin, Yvonne C., "Use of Structur-Activity Data To Compare Structure-Based Clustering Methods and Descriptors for Use in Compound Selection," *Journal of Chemical Information and Computer Sciences*, American Chemical Society, 1996, vol. 36, No. 3, pp. 572-584.

Cummins, David J. et al., "Molecular Diversity in Chemical Databases: Comparison of Medicinal Chemistry Knowledge Bases and Databases of Commerically Available Compounds," *Journal of Chemical Information and Computer Sciences*, American Chemical Society, 1996, vol. 36, No. 4, pp. 750-763.

Daylight Theory: Fingerprints (visited Sep. 26, 2000) <http://www.daylight.com/dayhtml/doc/theory/theory.finger.html>, 9 pages.

Daylight Theory: SMARTS (visited Sep. 26, 2000) <http://www.daylight.com/dayhtml/doc/theory/theory.smarts.html>, 10 pages.

Downs, Geoff M. and Barnard, John M., "Techniques for Generating Descriptive Fingerprints in Combinatorial Libraries," *J. Chem. Inf. Comput. Sci.*, American Chemical Society, 1997, vol. 37, No. 1, pp. 59-61.

Gillet, Valerie J., "Background Theory of Molecular Diversity," *Molecular Diversity in Drug Design*, Kluwer Academic Publishers, 1999, pp. 43-65.

Good, Andrew C. and Lewis, Richard A., "New Methodology for Profiling Combinatorial Libraries and Screening Sets: Cleaning Up the Design Process with HARPick," *Journal of Medicinal Chemistry*, American Chemical Society, 1997, vol. 40, No. 24, pp. 3926-3936.

Gorse, Dominique and Lahana, Roger, "Functional diversity of compund libraries," *Current opinion in chemical biology*, Elsevier Science Ltd., Jun. 2000, vol. 4, No. 3, pp. 287-294.

Jamois, Eric A. et al., "Evaluation of Reagent-Based and Product-Based Strategies in the Design of Combinatorial Library Subsets," *Journal of Chemical Information and Computer Sciences*, American Chemical Society, 2000, vol. 40, no. 1, pp. 63-70.

Leach, Andrew R. et al., "Implementation of a System for Reagent Selection and Library Enumeration, Profiling, and Design," *Journal of Chemical Information and Computer Sciences*, American Chemical Society, 1999, vol. 39, No. 6, pp. 1161-1172.

Leach, Andrew R. and Hann, Michael M., "The *in silico* world of virtual libraries," *Drug discovery today*, Elsevier Science Ltd., Aug. 2000, vol. 5, No. 8, pp. 326-336.

Lobanov, Victor S. and Agrafiotis, Dimitris K., "Stochastic Similarity Selections from Large Combinatorial Libraries," *Journal of Chemical Information and Computer Sciences*, American Chemical Society, Mar./Arp. 2000, vol. 40, No. 2, pp. 460-470.

Matter, Hans and Pötter, Thorsten, "Comparing 3D Pharmacophore Triplets and 2D Fingerprints for Selecting Diverse Compound Subsets," *Journal of Chemical Information and Computer Sciences*, American Chemical Society, 1999, vol. 39, No. 6, pp. 1211-1225.

Matter, Hans, "Selecting Optimally Diverse Compounds from Structure Databases: A Validation Study of Two-Dimensional and Three-Dimensional Molecular Descriptors," *Journal of Medicinal Chemistry*, American Chemical Society, 1997, vol. 40, No. 8, pp. 1219-1229.

Sadowski, Jens and Kubinyi, Hugo, "A Scoring Scheme for Descriminating between Drugd and Nondrugs," *Journal of Medicinal Chemistry*, American Chemical Society, 1998, vol. 41, No. 18, pp. 3325-3329.

Schnur, Dora, "Design and Diversity Analysis of Large Combinatorial Libraries Using Cell-Based Methods," *Journal of Chemical Information and Computer Sciences*, American Chemical Society, 1999, vol. 39, No. 1, pp. 36-45.

Schuffenhauer, Ansgar et al., "Similarity Searching in Files of Three-Dimensional Chemical Structures: Analysis of the BIOSTER Database Using Two-Dimensional Fingerprints and Molecular Field Descriptors," *Journal of Chemical Information and Computer Sciences*, American Chemical Society, 2000, vol. 40, No. 2, pp. 295-307.

Turner, David B. et al., "Rapid Quantification of Molecular Diversity for Selective Database Acquisition," *Journal of Chemical Information and Computer Sciences*, American Chemical Society, 1997, vol. 37, No. 1, pp. 18-22.

Wang, Jing and Ramnarayan, Kal, "Toward Designing Drug-Like Libraries: A Novel Computational Approach for Prediction of Durg Feasability of Compounds," *Journal of Combinatorial Chemistry*, American Chemical Society, Nov./Dec. 1999, vol. 1, No. 6, pp. 524-533.

Gasteiger, J. et al., "Assessment of the Diversity of Combinatorial Libraries by an Encoding of Molecular Surface Properties," *Abstracts of Papers Part 1: 211th ACS National Meeting*, Mar. 24-28, 1996, p. 70-CINF.

Hassan, Moises et al., "Optimization and visualization of molecular diversity of combinatorial libraries," *Molecular Diversity*, ESCOM Science Publishers B.V., 1996, vol. 2, pp. 64-74.

Bellman, R.E., *Adaptive Control Processes: A Guided Tour*, Princeton Univ. Press, Princeton, NJ (1961), entire book submitted.

Bezdek, J.C., *Pattern Recognition with Fuzzy Objective Function Algorithms*, Plenum Press, New York, NY (1981), entire book submitted.

Johnson, M.A., and Maggiora, G.M., *Concepts and Applications of Molecular Similarity*, John Wiley and Sons, New York, NY (1990), entire book submitted.

Kohonen, T., *Self-Organizing Mapes*, Springer-Verlag, Heidelberg, Germany (1995), entire book submitted.

Oja, E., *Subspace Methods of Pattern Recognition*, Research Studies Press, Letchworth, England, (1983), entire book submitted.

Agrafiotis, D.K., "A New Method For Analyzing Protein Sequence Relationships Based On Sammon Maps," *Protein Science*, Cambridge University Press, vol. 6, No. 2, Feb. 1997, pp. 287-293.

Copy of International Search Report issued Oct. 18, 1999, for Appl. No. PCT/US99/09963, 7 pages.

Amzel, L.M., "Structure-based drug design," *Current Opinion in Biotechnology*, vol. 9, No. 4, Aug. 1998, pp. 366-369.

Blaney, J.M. and Martin, E.J., "Computational approaches for combinatorial library design and molecular diversity analysis," *Current Opinion Chemical Biology*, Current Biology Ltd., vol. 1, No. 1, Jun. 1997, pp. 54-59.

Brown, R.D. and Clark, D.E., "Genetic diveristy: applications of evolutionary algorithms to combinatorial library design," *Expert Opinion on Therapeutic Patents*, vol. 8, No. 11, Nov. 1998, pp. 1447-1459.

Caflisch, A. and Karplus, M., "Computational combinatorial chemistry for de novo ligand design: Review and assessment," *Perspectives in Drug Discovery and Design*, ESCOM Science Publishers B.V., vol. 3, 1995, pp. 51-84.

Danheiser, S.L., "Current Trends in Synthetic Peptide and Chemical Diversity Library Design," *Genetic Engineering News*, May 1, 1994, pp. 10 and 31.

Eichler, U. et al., "Addressing the problem of molecular diversity," *Drugs of the Future*, Prous Science, vol. 24, No. 2, 1999, pp. 177-190.

Felder, E.R. and Poppinger, D., "Combinatorial Compound Libraries for Enhanced Drug Discovery Approached," *Advances in Drug Research*, Academic Press, vol. 30, 1997, pp. 112-199.

Geysen, H.M. and Mason, T.J., "Screening Chemically Synthesized PepTide Libraries for Biologically-Relevant Molecules," *Bioorganic & Medicinal Chemistry Letters*, Pergamon Press, Ltd., vol. 3, No. 3, 1993, pp. 397-404.

Gobbi, A. et al., "New Leads By Selective Screening of Compounds From Large Databases," *Abstracts of Papers Part 1: 213th ACS National Meeting*, Apr. 13-17, 1997, p. 67-CINF.

Houghten, R.A. et al., "The Use of Synthetic Peptide Combinatorial Libraries for the Identification of Bioactive Peptides," *Peptide Research*, vol. 5 No. 6, 1992, pp. 351-358.

Klopman, G., "Artificial Intelligence Approach to Structure-Activity Studies. Computer Automated Structure Evaluation of Biological Activity of Organic Molecules," *Journal of the American Chemical Society*, American Chemical Society, vol. 106, No. 24, Nov. 28, 1984, pp. 7315-7321.

Lajiness, M.S. et al., "Implementing Drug Screening Programs Using Molecular Similarity Methods," *QSAR: Quantitative Structure-Activity Relationships in Drug Design*, Alan R. Liss, Inc., 1989, pp. 173-176.

Loew, G.H. et al., "Strategies for Indirect Computer-Aided Drug Design," *Pharmaceutical Research*, Plenum Publishing Corporation, vol. 10, No. 4, 1993, pp. 475-486.

Lynch, M.F. et al., "Generic Structure Storage and Retrieval," *Journal of Chemical Information and Computer Sciences*, American Chemical Society, vol. 25, No. 3, Aug. 1985, pp. 264-270.

Myers, P.L. et al., "Rapid, Reliable Drug Discovery," *Today's Chemist At Work*, American Chemical Society, vol. 6, No. 7, Jul./Aug. 1997, pp. 46-48, 51 & 53.

Pabo, C.O. and Suchanek, E.G., "Computer-Aided Model-Building Strategies for Protein Design," *Biochemistry*, American Chemical Society, vol. 25, No. 20, 1986, pp. 5987-5991.

Saudek, V. et al., "Solution Conformation of Endothelin-1 by H NMR, CD, and Molecular Modeling," *International Journal of Peptide Protein Res.*, Munksgaard International Publishers Ltd., vol. 37, No. 3, 1991, pp. 174-179.

Singh, J. et al., "Application of Genetic Algorithms to Combinatorial Synthesis: A Computational Approach to Lead Identification and Lead Optimization," *Journal of the American Chemical Society*, American Chemical Society, vol. 118, No. 5, Feb. 7, 1996, pp. 1669-1676.

Van Drie, J.H. and Lajiness, M.S., "Approaches to virtual library design," *Drug Discovery today*, Elsevier Science Ltd., vol. 3, No. 6, Jun. 1998, pp. 274-283.

Walters, W.P. et al., "Virtual screening—an overview," *Drug Discovery today*, Elsevier Science Ltd., vol. 3, No. 4, Apr. 1998, pp. 160-178.

Weber, L., "Evolutionary combinatorial chemistry: application of genetic algorithms," *Drug Discovery today*, Elsevier Science Ltd., vol. 3, No. 8, Au. 1998, pp. 379-385.

Weber, L. et al., "Optimization of the Biological Activity of Combinatorial Compound Libraries by a Genetic Algorithm," *Angewandte Chemie International Edition in English*, VCH, vol. 34, No. 20, Nov. 3, 1995, pp. 2280-2282.

Graybill, T.L. et al., "Enhancing the Drug Discovery Process by Integration of High-Throughput Chemistry and Structure-Based Drug Design," from *Molecular Diversity and Combinatorial Chemistry: Libraries and Drug Discovery*, Chaiken and Janda (eds.), American Chemical Society, 1996, pp. 16-27.

Saund, E., "Dimensionality-Reduction Using Connectionist Networks," *IEEE Transactions on Pattern Analysis and Machine Intelligence*, IEEE, vol. 11, No. 3, Mar. 1989, pp. 304-314.

"3DP gains drug research patent", Chemistry in Britain, The Royal Society of Chemistry, vol. 32, No. 1, Jan. 1996, p. 22.

"Accelerate the Discovery Cycle with ChemOXI", Source and date of publication unclear, 2 pages.

Agrafiotis, D.K., "Stochastic Algorithms for Maximizing Molecular Diversity", *Journal of Chemical Information and Computer Sciences*, American Chemical Society, vol. 37, No. 5, 1997, pp. 841-851.

Alsberg, B.K. et al., "Classification of pyrolysis mass spectra by fuzzy multivariate rule induction-comparison with regression, $K$-nearest neighbour, neural and decision-tree methods", *Analytica Chimica Acta*, Elsevier Science B.V., vol. 348, No. 1-3, Aug. 20, 1997, pp. 389-407.

Andrea, T.A. and Kalayeh, H., "Applications of Neural Networks in Quantitative Structure-Activity Relationships of Dihydrofolate Reductase Inhibitors", *Journal of Medicinal Chemistry*, American Chemical Society, vol. 34, No. 9, 1991, pp. 2824-2836.

Aoyama, T. et al., "Neural Networks Applied to Quantitative Structure-Activity Relationships Analysis", *Journal of Medicinal Chemistry*, American Chemical Society, vol. 33, No. 9, 1990, pp. 2583-2590.

Aoyama, T. and Ichikawa, H., "Obtaining the Correlation Indices between Drug Activity and Structural Parameters Using a Neural Network", *Chemical & Pharmaceutical Bulletin*, Pharmaceutical Society of Japan, vol. 39, No. 2, Feb. 1991, pp. 372-378.

"ArQule Inc", from http://www.bioportfolio.com/arqule/products.htm, 5 pages, (Mar. 18, 1998).

Baum, R.M., "Combinatorial Approaches Provide Fresh Leads for Medicinal Chemistry", *Chemical 7 Engineering News*, American Chemical Society, Feb. 7, 1994, pp. 20-26.

Bentley, J. L., "Multidimensional Binary Search Trees Used for Associative Searching", *Communications of the ACM*, Association for Computing Machinery, Inc., vol. 18, No. 9, Sep. 1975, pp. 509-517.

Bottou, L. and Vapnik, V. "Local Learning Algorithms", *Neural Computation*, Massachusetts Institute of Technology, vol. 4, No. 6, Nov. 1992, pp. 888-900.

Boulu, L.G. and Crippen, G.M., "Voronoi Binding Site Models: Calculation of Binding Modes and Influence of Drug Binding Data Accuracy", *Journal of Computational Chemistry*, John Wiley & Sons, Inc., vol. 10, No. 5, Jul./Aug. 1989, pp. 673-682.

Boulu, L.G. et al., "Voronoi Binding Site Model of a Polycyclic Aromatic Hydrocarbon Binding Protein", *Journal of Medicinal Chemistry*, American Chemical Society, vol. 33, No. 2, 1990, pp. 771-775.

Brown, R. D. and Martin, Y.C., "Use of Structure-Activity Data To Compare Structure-Based Clustering Methods and Descriptors for Use in Compound Selection", *Journal of Chemical Information and Computer Sciences*, vol. 36, No. 3, 1996, pp. 572-584.

Cacoullos, T., "Estimation of a Multivariate Density", *Annals of The Institute of Statistical Mathematics*, The Institute of Statistical Mathematics, vol. 18, No. 2, 1966, pp. 179-189.

Clark, R.D., "OptiSim: An Extended Dissimilarity Selection Method for Finding Diverse Representative Subsets", *Journal of Chemical Information and Computer Sciences*, American Chemical Society, vol. 37, No. 6, 1997, pp. 1181-1188.

Clark, D. E., and Westhead, D.R., "Evolutionary algorithms in computer-aided molecular design", *Journal of Computer-Aided Molecular Design*, ESCOM Science Publishers B.V., vol. 10, No. 4, Aug. 1996, pp. 337-358.

Cramer, III, R. D. et al., "Comparative Molecular Field Analysis (CoMFA). 1. Effect of Shape on Binding of Steroids to Carrier Proteins", *Journal of The American Chemical Society*, American Chemical Society, vol. 110, No. 18, Aug. 31, 1988, pp. 5959-5967.

Cramer, III, R. D. et al., "Substructural Analysis. A Novel Approach to the Problem of Drug Design", *Journal of Medicinal Chemistry*, vo. 17, No. 5, May 1974, pp. 533-535.

Crippen, G. M., "Voronoi Binding Site Models", *Journal of Computational Chemistry*, John Wiley & Sons, Inc., vol. 8, No. 7, Oct./Nov. 1987, pp. 943-955.

Friedman, J. H. et al., "An Algorithm for Finding Best Matches in Logarithmic Expected Time", *ACM Transactions on Mathematical Software*, Association for Computing Machinery, vol. 3, No. 3, Sep. 1977, pp. 209-226.

Friedman, J.H., "Fitting Functions To Noisy Data In High Dimensions", Department of Statistics- Stanford University Technical Report No. 101, (Aug. 1988).

Gallop, M. A. et al., "Applications of Combinatorial Technologies to Drug Discovery. 1. Background and Peptide Combinatorial Libraries", *Journal of Medicinal Chemistry*, American Chemical Society, vol. 37, No. 9, Apr. 29, 1994, pp. 1233-1251.

Ghose, A. K. and Crippen, G.M., "Use of Physicochemical Parameters in Distance Geometry and Related Three-Dimensional Quantitative Structure-Activity Relationships: A Demonstration Using *Escherichia coli* Dihydrofolate Reductase Inhibitors", *Journal of Medicinal Chemistry*, American Chemical Society, vol. 28, No. 3, 1985, pp. 333-346.

Good, A.C. et al., "Structure-Activity Relationships from Molecular Similarity Matrices", *Journal of Medicinal Chemistry*, American Chemical Society, vol. 36, No. 4, Feb. 19, 1993, pp. 433-438.

Gordon, E. M. et al., "Applications of Combinatorial Technologies to Drug Discovery. 2. Combinatorial Organic Synthesis, Library Screening Strategies, and Future Directions", *Journal of Medicinal Chemistry*, American Chemical Society, vol. 37, No. 10, May 13, 1994, pp. 1385-1401.

Hartigan, J. A., "Representation of Similarity Matrices By Trees", *Journal of the American Statistical Association*, vol. 62, No. 320, Dec., 1967, pp. 1140-1158.

Hopfinger, A. J., "A QSAR Investigation of Dihydrofolate Reductase Inhibition by Baker Triazines Based upon Molecular Shape Analysis", *Journal of the American Chemical Society*, American Chemical Society, vol. 102, No. 24, Nov. 19, 1980, pp. 7196-7206.

Jackson, R. C., "Update on computer-aided drug design", *Current Opinion in BIOTECHNOLOGY*, Current Biology Ltd., vol. 6, No. 6, Dec. 1995, pp. 646-651.

Kim, K. H., "Comparative molecular field analysis (CoMFA)", *Molecular Similarity in Drug Design*, ed. P. M. Dean, Blackie Academic & Professional, 1995, Ch. 12, pp. 291-331.

Kohonen, T., "Self-Organized Formation of Topologically Correct Feature Maps", *Biological Cybernetics*, Springer-Verlag, vol. 43, No. 1, 1982, pp. 59-69.

Koile, K. and Shapiro, R., "Building A Collaborative Drug Design System", *Proceedings of the 25h Hawaii International Conference on System Sciences*, IEEE, 1992, pp. 706-716.

Kowalski, B. R. and Bender, C. F., "Pattern Recognition. II. Linear and Nonlinear Methods for Displaying Chemical Data", *Journal of the American Chemical Society*, American Chemical Society, vol. 95, no. 3, Feb. 7, 1973, pp. 686-693.

Kruskal, J. B., "Nonmetric Multidimensional Scaling: A Numerical Method", *Psychometrika*, vol. 29, No. 2, Jun., 1964, pp. 115-129.

Lengauer, T. and Rarey, M., "Computational methods for biomolecular docking", *Current Opinion in Structural Biology*, Current Biology Ltd, vol. 6, No. 3, Jun. 1996, pp. 402-406.

Luke, B. T., "Evolutionary Programming Applied to the Development of Quantitative Structure-Activity Relationships and Quantitative Structure-Property Relationships", *Journal of Chemical Information and Computer Sciences*, American Chemical Society, vol. 34, No. 6, Nov./Dec. 1994, pp. 1279-1287.

Martin, E. J. et al., "Does Combinatorial Chemistry Obviate Computer-Aided Drug Design?"m *Reviews in Computational Chemistry*, VCH Publishers, Inc., vol. 10, 1997, pp. 75-99.

Martin, E. J. et al., "Measuring Diversity: Experimental Design of Combinatorial Libraries for Drug Discovery", *Journal of Medicinal Chemistry*, American Chemical Society, vol. 38, No. 9, Apr. 28, 1995, pp. 1431-1436.

McMartin, C. and Bohacek, R.S., "QXP: Powerful, rapid computer algorithms for structure-based drug design", *Journal of Computer-Aided Molecular Design*, Kluwer-Academic Publishers, vol. 11, No. 4, Jul. 1997, pp. 333-344.

Mezey, P. G. and Walker, P.D., "Fuzzy molecular fragments in drug research", *Drug Discovery today*, Elsevier Science Ltd., vol. 2, No. 4, Apr. 1997, pp. 132-137.

Müller, K., "On the paradigm shift from rational to random design", *Journal of Molecular Structure (Theochem)*, Elsevier Science B.V., vol. 398-399, Special Issue, pp. 467-471.

Myers, P., "The Design Of A Universal, Informer™ Library", COMBICHEM, Inc., 10 pages, Date unknown.

Oinuma, H. et al., "Neural Networks Applied to Structure-Activity Relationships", *Journal of Medicinal Chemistry*, vol. 33, No. 3, pp. 905-908, (1990).

Omohundro, S. M., "Bumptrees for Efficient Function, Constraint, and Classification Learning", *Advances in Neural Information Processing Systems 3*, Morgan Kaufmann, 1991, 7 pages, unknown.

Parrill, A. L., "Evolutionary and genetic methods in drug design", *Drug Discovery today*, Elsevier Science Ltd., vol. 1, No. 12, Dec. 1996, pp. 514-521.

Polanski, J., "A Neural network for the simulation of biological systems", *Journal of Molecular Structure (Theochem)*, Elsevier Science Ltd., vol. 398-399, Special Issue, pp. 565-571.

Ramos-Nino, M. E. et al., "A comparison of quantitative structure-activity relationships for the effect of benzoic and cinnamic acids on *Listeria monocytogenes* using multiple linear regression, artificial neural network and fuzzy systems", *Journal of Applied Microbiology*, Society for Applied Bacteriology, vol. 82, No. 2, Feb. 1997, pp. 168-175.

Rogers, D. and Hopfinger, A. J., "Application of Genetic Function Approximation to Quantitative Structure-Activity Relationships and Quantitative Structure-Property Relationships", *Journal of Chemical Information and Computer Sciences*, American Chemical Society, vol. 34, No. 4, Jul./Aug. 1994, pp. 854-866.

Sammon, Jr., J. W., "A Nonlinear Mapping for Data Structure Analysis", *IEEE Transactions on Computers*, IEEE, vol. C-18, No. 5, May 1969, pp. 401-409.

Simon, Z. et al., "Mapping of Dihydrofolate-reductase Receptor Site by Correlation with Minimal Topological (Steric) Differences", *Journal of Theoretical Biology*, Academic Press, Inc., vol. 66, No. 3, Jun. 7, 1977, pp. 485-495.

Smellie, A. S. et al., "Fast Drug-Receptor Mapping by Site-Directed Distances: A Novel Method of Predicting New Pharmacological Leads", *Journal of Chemical Information and Computer Sciences*, American Chemical Society, vol. 31, No. 3, Aug. 1991, pp. 386-392.

Specht, D. F., "A General Regression Neural Network", *IEEE Transactions on Neural Networks*, IEEE, vol. 2, No. 6, Nov. 1991, pp. 568-576.

Svizil, D. et al., "Neural Network Prediction of the Solvatochromic Polarity/Polarizability Parameter $\pi^H_2$", *Journal of Chemical Information and Computer Sciences*, American Chemical Society, vol. 37, no. 2, 1997, pp. 338-342.

Todorov, N. P. and Dean, P. M., "Evaluation of a method for controlling molecular scaffold diversity in de novo ligand design", *Journal of Computer-Aided Molecular Design*, ESCOM Science Publishers B.V., vol. 11, 1997, pp. 175-192.

Torgerson, W. S., "Mulridimensional Scaling: I. Theory and Method", *Psychometrika*, The Psychometric Society, vol. 17, no. 4, Dec. 1952, pp. 401-419.

Vapnik, V., "Principles of Risk Minimization for Learning Theory", *Advances in Neural Information Processing Systems 4*, Morgan Kaufmann Publishers, Inc., 1992, pp. 831-838.

Vapnik, V. and Bottou, L., "Local Algorithms for Pattern Recognition and Dependencies Estimation", *Neural Computation*, Massachusetts Institute of Technology, vol. 5, No. 6, Nov. 1993, pp. 893-909.

Viswanadhan, V. N. et al., "Mapping the binding site of the nucleoside transporter protein: a 3D-QSAR study", *Biochimica et Biophysica Acta*, Elsevier Science Publishers B.V., vol. 1039, No. 1, 1990, pp. 356-366.

Warr, W. A., "Exploiting Molecular Diversity: Small Molecule Libraries for Drug Discovery", Report of Conference held in La Jolla, California, Jan. 23-25, 1995.

Westhead, D. R. et al., "A comparison of heuristic search algorithms for molecular docking", *Journal of Computer-Aided Molecular Design*, Kluwer Academic Publishers, vol. 11, 1997, pp. 209-228.

Willett, P., "Genetic algorithms in molecular recognition and design", *Trends in Biotechnology*, Elsevier Science Publishers B.V., vol. 13, No. 12, Dec. 1995, pp. 516-521.

Willettm P. and Winterman, V., "A Comparison of Some Measures for the Determination of Inter-Molecular Structural Similarity Measures of Inter-Molecular Structural Similarity", *Quantitative Structure-Activity Relationships*, VCH, vol. 5, No. 1, Mar. 1986, pp. 18-25.

Zadeh, L. A. "Communication Fuzzy Algorithms", *Information and Control*, Academic Press, vol. 12, No. 2, Feb. 1968, pp. 94-102.

Zadeh, L. A., "Fuzzy Sets", *Information and Control*, Academic Press, vol. 8, No. 3, Jun. 1965, pp. 338-353.

Copy of International Search Report issued Apr. 21, 1998 for Appl. No. PCT/US97/20919, 6 pages.

Copy of International Search Report issued May 13, 1998 for Appl. No. PCT/US97/20918, 7 pages.

Aiyama, T. et al., "Neural Networks Applied to Structure-Activity Relationships", *Journal of Medicinal Chemistry*, American Chemical Society, vol. 33., No. 3, 1990, pp. 905-908.

Gasteiger, J. et al., "Analysis of the Reactivity of Single Bonds in Aliphatic Molecules by Statistical and Pattern Recognition Methods," *Journal of Chemical Information computer Sciences*, American chemical Society, vol. 22, No. 3, 1993, pp. 385-394.

Gues, A. and Nevo, I., "Neural networks and fuzzy logic in clinical laboratory computing with application to integrated monitoring," Clinica Chimica Acta, Elsevier Science Publishers B.V., vol. 248, 1996, pp. 73-90.

Rouvray, D.H., "Similarity in Chemistry: Past, Present and Future," *Topics in Chemistry*, Springer-Verlag, vol. 173, 1995, pp. 1-30.

de Ridder, D. and Duin, R.P.W., "Sammon's mapping using neural networks: A comparison," *Pattern Recognition Letters*, Elsevier Science Publishers B.V., vol. 18, No. 11-13, 1997, pp. 1307-1316.

Kim, H. et al., "Self-Organized Distributed Networks for Learning Highly Nonlinear Mapping," *Intelligent Engineering Systems Through Artificial Neural Networks*, American Society of Mechanical Engineers, vol. 4, Nov. 13-16, 1994, pp. 109-114.

Pal, N.R. and Eluri, V.K., "Two Efficient Connectionist Schemes for Structure Preserving Dimensionality Reduction," *IEEE Transactions on Neural Networks*, IEEE, vol. 9, No. 6, Nov. 1998, pp. 1142-1154.

Domine, D. et al., "Non-Linear Mapping for Structure-Activity and Structure-Property Modelling," *Journal of Chemometrics*, John Wiley & Sons, Ltd., vol. 7, No. 4, Jul.-Aug. 1993, pp. 227-242.

Hosenpud, J. et al., "The Effect of Transplant Center Volume on Cardiac Transplant Outcome: A Report of the United Network for Organ Sharing Scientific Registry," *Journal of the American Medical Association*, American Medical Association, vol. 271, No. 23, Jun. 15, 1994, pp. 1844-1849.

Kim, J. et al., "Multiple Neural Networks Using The Reduced Input Dimension," *Proceedings of the International Conference on Acoustics, Speech, and Signal Processing (ISASSP)*, IEEE, Apr. 19-22, 1994, pp. II-601-604.

Copy of International Search Report issued May 28, 2002 for Appln. No. PCT/US01/08974, 7 pages.

\* cited by examiner

SYSTEM, METHOD, AND COMPUTER PROGRAM PRODUCT FOR REPRESENTING OBJECT RELATIONSHIPS IN A MULTIDIMENSIONAL SPACE

CROSS-REFERENCE TO RELATED APPLICATIONS

This application claims the benefit of U.S. Provisional Application No. 60/191,108, filed Mar. 22, 2000 (incorporated in its entirety herein by reference).

BACKGROUND OF THE INVENTION

1. Field of the Invention

The invention described herein relates to information representation, information cartography and data mining. The present invention also relates to pattern analysis and representation, and, in particular, representation of object relationships in a multidimensional space.

2. Related Art

Reducing the dimensionality of large multidimensional data sets is an important objective in many data mining applications. High-dimensional spaces are sparse (Bellman, R. E., Adaptive Control Processes, Princeton University Press, Princeton (1961)), counter-intuitive (Wegman, E., J. Ann. Statist. 41:457–471 (1970)), and inherently difficult to understand, and their structure cannot be easily extracted with conventional graphical techniques. However, experience has shown that, regardless of origin, most multivariate data in $R^d$ are almost never truly d-dimensional. That is, the underlying structure of the data is almost always of dimensionality lower than d. Extracting that structure into a low-dimensional representation has been the subject of countless studies over the past 50 years, and several techniques have been devised and popularized through the widespread availability of commercial statistical software. These techniques are divided into two main categories: linear and nonlinear.

Perhaps the most common linear dimensionality reduction technique is principal component analysis, or PCA (Hotelling, H., J. Edu. Psychol. 24:417–441; 498–520 (1933)). PCA reduces a set of partially cross-correlated data into a smaller set of orthogonal variables with minimal loss in the contribution to variation. The method has been extensively tested and is well-understood, and several effective algorithms exist for computing the projection, ranging from singular value decomposition to neural networks (Oja, E., Subspace Methods of Pattern Recognition, Research Studies Press, Letchworth, England (1983); Oja, E., Neural Networks 5:927–935 (1992); Rubner, J., and Tavan, P., Europhys. Lett. 10:693–698 (1989)). PCA makes no assumptions about the probability distributions of the original variables, but is sensitive to outliers, missing data, and poor correlations due to poorly distributed variables. More importantly, the method cannot deal effectively with non-linear structures, curved manifolds, and arbitrarily shaped clusters.

A more general methodology is Friedman's exploratory projection pursuit (EPP) (Friedman, J. H., and Tukey, J. W., IEEE Trans. Computers 23:881–890 (1974); Friedman, J. H., J. Am. Stat. Assoc. 82:249–266 (1987)). This method searches multidimensional data sets for interesting projections or views. The "interestingness" of a projection is typically formulated as an index, and is numerically maximized over all possible projections of the multivariate data. In most cases, projection pursuit aims at identifying views that exhibit significant clustering and reveal as much of the non-normally distributed structure in the data as possible. The method is general, and includes several well-known linear projection techniques as special cases, including principal component analysis (in this case, the index of interestingness is simply the sample variance of the projection). Once an interesting projection has been identified, the structure that makes the projection interesting may be removed from the data, and the process can be repeated to reveal additional structure. Although projection pursuit attempts to express some nonlinearities, if the data set is high-dimensional and highly nonlinear it may be difficult to visualize it with linear projections onto a low-dimensional display plane, even if the projection angle is carefully chosen.

Several approaches have been proposed for reproducing the nonlinear structure of higher-dimensional data spaces. The best-known techniques are self-organizing maps, auto-associative neural networks, multidimensional scaling, and nonlinear mapping.

Self-organizing maps or Kohonen networks (Kohonen, T., Self-Organizing Maps, Springer-Verlag, Heidelberg (1996)) were introduced by Kohonen in an attempt to model intelligent information processing, i.e. the ability of the brain to form reduced representations of the most relevant facts without loss of information about their interrelationships. Kohonen networks belong to a class of neural networks known as competitive learning or self-organizing networks. Their objective is to map a set of vectorial samples onto a two-dimensional lattice in a way that preserves the topology and density of the original data space. The lattice points represent neurons which receive identical input, and compete in their activities by means of lateral interactions. The main application of self-organizing maps is in visualizing complex multi-variate data on a 2-dimensional plot, and in creating abstractions reminiscent of these obtained from clustering methodologies. These reduced representations can subsequently be used for a variety of pattern recognition and classification tasks.

Another methodology is that of auto-associative neural networks (DeMers, D., and Cottrell, G., Adv. Neural Info. Proces. Sys. 5:580–587 (1993); Garrido, L., et al., Int. J. Neural Sys. 6:273–282 (1995)). These are multi-layer feed-forward networks trained to reproduce their inputs as desired outputs. They consist of an input and an output layer containing as many neurons as the number of input dimensions, and a series of hidden layers having a smaller number of units. In the first part of the network, each sample is reorganized, mixed, and compressed into a compact representation encoded by the middle layer. This representation is then decompressed by the second part of the network to reproduce the original input. Auto-associative networks can be trained using conventional back-propagation or any other related technique available for standard feed-forward architectures. A special version of the multilayer perceptron, known as a replicator network (Hecht-Nielsen, R., Science 269:1860–1863 (1995)), has been shown to be capable of representing its inputs in terms of their "natural coordinates". These correspond to coordinates in an m-dimensional unit cube that has been transformed elastically to fit the distribution of the data. Although in practice it may be difficult to determine the inherent dimensionality of the data, the method could, in theory, be used for dimensionality reduction using a small value of m.

The aforementioned techniques can be used only for dimension reduction. A more broadly applicable method is multidimensional scaling (MDS) or nonlinear mapping (NLM). This approach emerged from the need to visualize a set of objects described by means of a similarity or distance matrix. The technique originated in the field of mathematical psychology (see Torgeson, W. S., Psychometrika, 1952, and Kruskal, J. B. Phychometrika, 1964, both of which are incorporated by reference in their entirety), and has two primary applications: 1) reducing the dimensionality of high-dimensional data in a way that preserves the original relationships of the data objects, and 2) producing Cartesian coordinate vectors from data supplied directly in the form of similarities or proximities, so that they can be analyzed with conventional statistical and data mining techniques.

Given a set of k objects, a symmetric matrix, $r_{ij}$, of relationships between these objects, and a set of images on a m-dimensional display plane $\{y_i, i=1, 2, \ldots, k; y_i \in R^m\}$, the problem is to place $y_i$ onto the plane in such a way that their Euclidean distances $d_{ij} = \|y_i - y_j\|$ approximate as closely as possible the corresponding values $r_{ij}$. The quality of the projection is determined using a loss function such as Kruskal's stress:

$$S = \sqrt{\frac{\sum_{i<j}(d_{ij} - r_{ij})^2}{\sum_{i<j} r_{ij}^2}} \quad (1)$$

which is numerically minimized in order to find the optimal configuration. The actual embedding is carried out in an iterative fashion by: 1) generating an initial set of coordinates $y_i$, 2) computing the distances $d_{ij}$, 3) finding a new set of coordinates $y_i$ using a steepest descent algorithm such as Kruskal's linear regression or Guttman's rank-image permutation, and 4) repeating steps 2 and 3 until the change in the stress function falls below some predefined threshold.

A particularly popular implementation is Sammon's nonlinear mapping algorithm (Sammon, J. W. IEEE Trans. Comp., 1969). This method uses a modified stress function:

$$E = \frac{\sum_{i<j}^{k} \frac{[r_{ij} - d_{ij}]^2}{r_{ij}}}{\sum_{i<j}^{k} r_{ij}} \quad (2)$$

which is minimized using steepest descent. The initial coordinates, $y_i$, are determined at random or by some other projection technique such as principal componenet analysis, and are updated using Eq. 3:

$$y_{ij}(t+1) = y_{ij}(t) - \lambda \Delta_{ij}(t) \quad (3)$$

where t is the iteration number and $\lambda$ is the learning rate parameter, and $$\Delta_{ij}(t) = \frac{\frac{\partial E(t)}{\partial y_{ij}(t)}}{\left|\frac{\partial^2 E(t)}{\partial y_{ij}(t)^2}\right|} \quad (4)$$

There is a wide variety of MDS algorithms involving different error functions and optimization heuristics, which are reviewed in Schiffman, Reynolds and Young, Introduction to *Multidimensional Scaling*, Academic Press, New York (1981); Young and Hamer, *Multidimensional Scaling: History, Theory and Applications*, Erlbaum Associates, Inc., Hillsdale, N.J. (1987); Cox and Cox, *Multidimensional Scaling*, Number 59 in *Monographs in Statistics and Applied Probability*, Chapman-Hall (1994), and Borg, I., Groenen, P., Modem Multidimensional Scaling, Springer-Verlag, New York, (1997). The contents of these publications are incorporated herein by reference in their entireties. Different forms of NLM will be discussed in greater detail below.

Unfortunately, the quadratic nature of the stress function (Eqs. 1 and 2, and their variants) make these algorithms impractical for large data sets containing more than a few hundred to a few thousand items. Several attempts have been devised to reduce the complexity of the task. Chang and Lee (Chang, C. L., and Lee, R. C. T., *IEEE Trans. Syst., Man, Cybern.*, 1973, SMC-3, 197–200) proposed a heuristic relaxation approach in which a subject of the original objects (the frame) are scaled using a Sammon-like methodology, and the remaining objects are then added to the map by adjusting their distances to the objects in the frame. An alternative approach proposed by Pykett (Pykett, C. E., *Electron. Lett.*, 1978, 14, 799–800) is to partition the data into a set of disjoint clusters, and map only the cluster prototypes, i.e. the centroids of the pattern vectors in each class. In the resulting two-dimensional plots, the cluster prototypes are represented as circles whose radii are proportional to the spread in their respective classes. Lee, Slagle and Blum (Lee, R. C. Y., Slagle, J. R., and Blum, H., *IEEE Trans. Comput.*, 1977, C-27, 288–292) proposed a triangulation method which restricts attention to only a subset of the distances between the data samples. This method positions each pattern on the plane in a way that preserves its distances from the two nearest neighbors already mapped. An arbitrarily selected reference pattern may also be used to ensure that the resulting map is globally ordered. Biswas, Jain and Dubes (Biswas, G., Jain, A. K., and Dubes, R. C., *IEEE Trans. Pattern Anal. Machine Intell.*, 1981, PAMI-3(6), 701–708) later proposed a hybrid approach which combined the ability of Sammon's algorithm to preserve global information with the efficiency of Lee's triangulation method. While the triangulation can be computed quickly compared to conventional MDS methods, it tries to preserve only a small fraction of relationships, and the projection may be difficult to interpret for large data sets.

The methods described above are iterative in nature, and do not provide an explicit mapping function that can be used to project new, unseen patterns in an efficient manner. The first attempt to encode a nonlinear mapping as an explicit function is due to Mao and Jain (Mao, J., and Jain, A. K., *IEEE Trans. Neural Networks* 6(2):296–317 (1995)). They proposed a 3-layer feed-forward neural network with n input and m output units, where n and m are the number of input and output dimensions, respectively. The system is trained using a special back-propagation rule that relies on errors that are functions of the inter-pattern distances. However, because only a single distance is examined during each iteration, these networks require a very large number of iterations and converge extremely slowly.

An alternative methodology is to employ Sammon's nonlinear mapping algorithm to project a small random sample of objects from a given population, and then "learn" the underlying nonlinear transform using a multilayer neural network trained with the standard error back-propagation algorithm or some other equivalent technique (see for example, Haykin, S. Neural Networks: A Comprehensive Foundation. Prentice-Hall, 1998). Once trained, the neural network can be used in a feed-forward manner to project the remaining objects in the plurality of objects, as well as new, unseen objects. Thus, for a nonlinear projection from n to m dimensions, a standard 3-layer neural network with n input and m output units is used. Each n-dimensional object is presented to the input layer, and its coordinates on the m-dimensional nonlinear map are obtained by the respective units in the output layer (Pal, N. R. Eluri, V. K., *IEEE Trans. Neural Net.*, 1142–1154 (1998)).

The distinct advantage of this approach is that it captures the nonlinear mapping relationship in an explicit function, and allows the scaling of additional patterns as they become available, without the need to reconstruct the entire map. It does, however, rely on conventional MDS methodologies to construct the nonlinear map of the training set, and therefore the method is inherently limited to relatively small samples.

Hence there is a need for a method that can efficiently process large data sets, e.g., data sets containing hundreds of thousands to millions of items.

Moreover, just like Mao and Jain (Mao, J., and Jain, A. K., *IEEE Trans. Neural Networks* 6(2):296–317 (1995)) and Pal and Eluri (Pal, N. R. Eluri, V. K., *IEEE Trans. Neural Net.*, 1142–1154 (1998)), a method is needed that is incremental in nature, and allows the mapping of new samples as they become available, without the need to reconstruct an entire map.

SUMMARY OF THE INVENTION

A method and computer product is presented for mapping input patterns of high dimensionality into a lower dimensional space so as to preserve the relationships between these patterns in the higher dimensional space. A subset of the input patterns is chosen and mapped into the lower dimensional space using an iterative process based on subset refinements. A set of local regions is defined using a clustering methodology, and a local neural network is associated with each of these regions, and trained in accordance with the mapping obtained from the iterative process. Additional input patterns not in the subset are mapped into the lower dimensional space by using one of the local neural networks. In an alternative embodiment, the local neural networks are only used after training and use of a global neural network. The global neural network is trained in accordance with the results of the mapping produced by the iterative process. Input patterns are fed into the global neural network, resulting in patterns in the lower dimensional space. Local neural networks are then used to refine the results of the global network.

The method and computer product described herein permits the mapping of massive data sets from a higher dimensional space to a lower dimensional space. Moreover, the method allows the mapping of new input patterns as they become available, without the need to reconstruct an entire map.

The foregoing and other features and advantages of the invention will be apparent from the following, more particular description of a preferred embodiment of the invention, as illustrated in the accompanying drawings.

BRIEF DESCRIPTION OF THE DRAWINGS/FIGURES

DETAILED DESCRIPTION OF THE INVENTION

Figure 1:
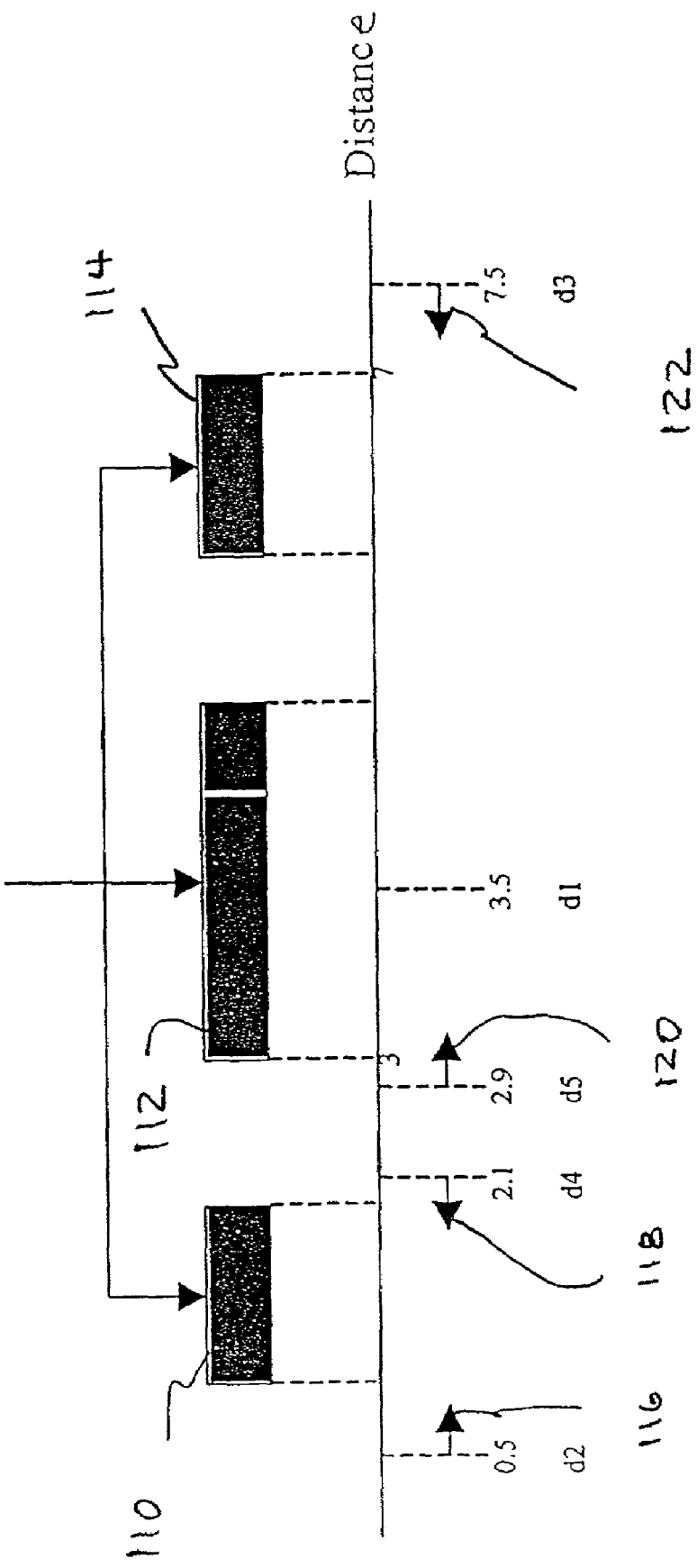
FIG. 1 illustrates possibilities for a single hypothetical pairwise relationship and distances of corresponding objects on a nonlinear map.

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Introduction

A. Overview

A neural network architecture for reducing the dimensionality of very large data sets is presented here. The method is rooted on the principle of probability sampling, i.e. the notion that a small number of randomly chosen members of a given population will tend to have the same characteristics, and in the same proportion, with the population as a whole. The approach employs an iterative algorithm based on subset refinements to nonlinearly map a small random sample which reflects the overall structure of the data, and then "learns" the underlying nonlinear transform using a set of distributed neural networks, each specializing in a particular domain of the feature space. The partitioning of the data space can be carried out using a clustering methodology. This local approach eliminates a significant portion of the imperfection of the nonlinear maps produced by a single multi-layer perceptron, and does so without a significant computational overhead. The proposed architecture is general and can be used to extract constraint surfaces of any desired dimensionality.

The following section discusses methods that can be used to nonlinearly map a random subset of the data.

B. Nonlinear Mapping Using Subset Refinements

1. Overview

A nonlinear mapping algorithm that is well suited for large data sets is presented in U.S. patent application Ser. No. 09/303,671, filed May 3, 1999, titled, "Method, System and Computer Program Product for Nonlinear Mapping of Multidimensional Data", and U.S. patent application Ser. No. 09/073,845, filed May 7, 1998, titled, "Method, System and Computer Program Product for Representing Proximity Data in a Multidimensional Space". This approach is to use iterative refinement of coordinates based on partial or stochastic errors.

The method uses a self-organizing principle to iteratively refine an initial (random or partially ordered) configuration of objects by analyzing only a subset of objects and their associated relationships at a time. The relationship data may be complete or incomplete (i.e. some relationships between objects may not be known), exact or inexact (i.e. some or all relationships may be given in terms of allowed ranges or limits), symmetric or asymmetric (i.e. the relationship of object A to object B may not be the same as the relationship of B to A) and may contain systematic or stochastic errors.

The relationships between objects may be derived directly from observation, measurement, a priori knowledge, or intuition, or may be determined directly or indirectly using any suitable technique for deriving such relationships.

The invention determines the coordinates of a plurality of objects on the m-dimensional nonlinear map by:

(1) placing the objects on the m-dimensional nonlinear map;

(2) selecting a subset of the objects, wherein the selected subset of objects includes associated relationships between objects in the selected subset;

(3) revising the coordinate(s) of one or more objects in the selected subset of objects on the m-dimensional nonlinear map based on the relationship(s) between some of these objects and their corresponding distance(s) on the nonlinear map;

(4) repeating steps (2) and (3) for additional subsets of objects from the plurality of objects.

In one embodiment, subsets of objects can be selected randomly, semi-randomly, systematically, partially systematically, etc. As subsets of objects are analyzed and their distances on the nonlinear map are revised, the set of objects tends to self-organize.

In a preferred embodiment, the invention iteratively analyzes a pair of objects at a time, that is, step (2) is carried out by selecting a pair of objects having an associated pairwise relationship. Pairs of objects can be selected randomly, semi-randomly, systematically, partially systematically, etc. Novel algorithms and techniques for pairwise analysis are provided in the sections below. This embodiment is described for illustrative purposes only and is not limiting.

2. Pairwise Relationship Matrices without Uncertainties a. Full Pairwise Relationship Matrices without Uncertainties The discussion in this section assumes that all pairwise relationships are known, and they are all exact. In a preferred embodiment, the method starts with an initial configuration of points generated at random or by some other procedure such as principal component analysis. This initial configuration is then continuously refined by repeatedly selecting two objects, i, j, at random, and modifying their coordinates on the nonlinear map according to Eq. 5:

$$y_i(t+1) = f(t, y_i(t), y_j(t), r_{ij}) \quad (5)$$

where t is the current iteration, $y_i(t)$ and $y_j(t)$ are the current coordinates of the i-th and j-th objects on the nonlinear map, $y_i(t+1)$ are the new coordinates of the i-th object on the nonlinear map, and $r_{ij}$ is the relationship between the i-th and j-th objects. $f(.)$ in Eq. 5 above can assume any functional form. Ideally, this function should try to minimize the difference between the distance on the nonlinear map and the actual relationship between the i-th and j-th objects. For example, $f(.)$ may be given by Eq. 6:

$$y_i(t+1) = 0.5 \lambda(t) \frac{r_{ij} - d_{ij}(t)}{d_{ij}(t)} (y_i(t) - y_j(t)) \quad (6)$$

where t is the iteration number, $d_{ij} = \|y_i(t) - y_j(t)\|$, and $\lambda(t)$ is an adjustable parameter, referred to hereafter as the "learning rate". This process is repeated for a fixed number of cycles, or until some global error criterion is minimized within some prescribed tolerance. A large number of iterations are typically required to achieve statistical accuracy.

The method described above is generally reminiscent of the error back-propagation procedure for training artificial neural networks described in Werbos, Beyond Regression: New Tools for Prediction and Analysis in the Behavioral Sciences, PhD Thesis, Harvard University, Cambridge, Mass. (1974), and Rumelhart and McClell and, Eds., Parallel Distributed Processing: Explorations in the Microstructure of Cognition, Vol. 1, MIT Press, Cambridge, Mass. (1986), both of which are incorporated herein by reference in their entireties.

The learning rate $\lambda(t)$ in EQ. 6 plays a key role in ensuring convergence. If $\lambda$ is too small, the coordinate updates are small, and convergence is slow. If, on the other hand, $\lambda$ is too large, the rate of learning may be accelerated, but the nonlinear map may become unstable (i.e. oscillatory). Typically, $\lambda$ ranges in the interval [0, 1] and may be fixed, or it may decrease monotonically during the refinement process. Moreover, $\lambda$ may also be a function of i, j, $r_{ij}$, and/or $d_{ij}$, and can be used to apply different weights to certain objects, relationships, distances and/or relationship or distance pairs. For example, $\lambda$ may be computed by Eq. 7:

$$\lambda(t) = \left(\lambda_{min} + t\frac{\lambda_{max} - \lambda_{min}}{T}\right)\frac{1}{1 + ar_{ij}} \quad (7)$$

or Eq. 8:

$$\lambda(t) = \left(\lambda_{min} + t\frac{\lambda_{max} - \lambda_{min}}{T}\right)e^{-ar_{ij}} \quad (8)$$

where $\lambda_{max}$ and $\lambda_{min}$ are the (unweighted) starting and ending learning rates such that $\lambda_{max}, \lambda_{min}, \in [0,1]$, T is the total number of refinement steps (iterations), t is the current iteration number, and $\alpha$ is a constant scaling factor. EQ. 7 and 8 have the effect of decreasing the correction at large separations (weak relationships), thus creating a nonlinear map which preserves strong relationships (short distances) more faithfully than weak ones. Weighting is discussed in greater detail below.

One of the main advantages of this approach is that it makes partial refinements possible. It is often sufficient that the pairwise similarities are represented only approximately to reveal the general structure and topology of the data. Unlike traditional MDS, this approach allows very fine control of the refinement process. Moreover, as the nonlinear map self-organizes, the pairwise refinements become cooperative, which partially alleviates the quadratic nature of the problem.

The embedding procedure described above does not guarantee convergence to the global minimum (i.e., the most faithful embedding in a least-squares sense). If so desired, the refinement process may be repeated a number of times from different starting configurations and/or random number seeds.

The general algorithm described above can also be applied when the pairwise similarity matrix is incomplete, i.e. when some of the pairwise similarities are unknown, when some of the pairwise similarities are uncertain or corrupt, or both of the above. These cases are discussed separately below.

b. Sparse Pairwise Relationship Matrices without Uncertainties

The general algorithm described above can also be applied when the pairwise relationship matrix is incomplete, i.e. when some of the pairwise relationships are unknown. In this case, a similar algorithm to the one described above can be used, with the exception that the algorithm iterates over pairs of objects for which the relationships are known. In this case, the algorithm identifies configurations in space that satisfy the known pairwise relationships; the unknown pairwise relationships adapt during the course of refinement and eventually assume values that lead to a satisfactory embedding of the known relationships.

Depending on the number of missing data, there may be more than one satisfactory embeddings (mappings) of the original relationship matrix. In this case, different configurations (maps) may be derived from different starting configurations or random number seeds. In some applications such as searching the conformational space of molecules, this feature provides a significant advantage over some alternative techniques. All variants of the original algorithm (see Sections below) can be used in this context.

3. Pairwise Relationship Matrices with Bounded Uncertainties

The general algorithm described above can also be applied when the pairwise relationships contain bounded uncertainties, i.e. when some of the pairwise relationships are only known to within certain fixed tolerances (for example, the relationships are known to lie within a range or set of ranges with prescribed upper and lower bounds). In this case, a similar algorithm to the one described above can be used, with the exception that the distances on the nonlinear map are corrected only when the corresponding objects lie outside the prescribed bounds. For example, assume that the relationship between two objects, i and j, is given in terms of an upper and lower bound, $r_{max}$ and $r_{min}$, respectively. When this pair of objects is selected during the course of the refinement, the distance of the objects on the nonlinear map is computed, and denoted as $d_{ij}$. If $d_{ij}$ is larger than $r_{max}$, the coordinates of the objects are updated using $r_{max}$ as the target distance (Eq. 9):

$$y_i(t+1) = f(t, y_i(t), y_j(t), r_{max}) \quad (9)$$

Conversely, if $d_{ij}$ is smaller than $r_{min}$ the coordinates of the objects are updated using $r_{min}$ in as the target distance (Eq. 10):

$$y_i(t+1) = f(t, y_i(t), y_j(t), r_{min}) \quad (10)$$

If $d_{ij}$ lies between the upper and lower bounds (i.e. if $r_{min} \neq d_{ij} \neq r_{max}$), no correction is made. In other words, the algorithm attempts to match the upper bound if the current distance between the objects is greater than the upper bound, or the lower bound if the current distance between the objects is lower than the lower bound. If the distance between the objects lies within the upper and lower bounds, no correction is made.

This algorithm can be extended in the case where some of the pairwise relationships are given by a finite set of allowed discrete values, or by a set of ranges of values, or some combination thereof. For the purposes of the discussion below, we consider discrete values as ranges of zero width (e.g. the discrete value of 2 can be represented as the range [2,2]).

Various possibilities for a single hypothetical pairwise relationship and the current distance of the corresponding objects on the nonlinear map are illustrated in FIG. 1, where shaded areas 110, 112 and 114 denote allowed ranges for a given pairwise relationship. Distances d1–d5 illustrate 5 different possibilities for the current distance between the corresponding objects on the nonlinear map. Arrows 116, 118, 120 and 122 indicate the direction of the correction that should be applied on the objects on the map. Arrows 118 and 122 point to the left, indicating that the coordinates of the associated objects on the nonlinear map should be updated so that the objects come closer together. Arrows 116 and 120 point to the right, indicating that the coordinates of the associated objects should be updated so that the objects become more distant.

As in the case of a single range, if the current distance of a selected pair of objects on the nonlinear map lies within any of the prescribed ranges, no coordinate update takes place (i.e., case d1 in FIG. 1). If not, the correction is applied using the nearest range boundary as the target distance (i.e., cases d2–d5 in FIG. 1). For example, if the relationship between a given pair of objects lies in the ranges [1,2], [3,5] and [6,7] and their current distance on the nonlinear map is 2.9 (d5 in FIG. 1), the correction takes place using 3 as the target distance ($r_{ij}$) in Eq. 5. If, however, the current distance is 2.1, the coordinates are updated using 2 as the target distance ($r_{ij}$) in Eq. 5.

This deterministic criterion may be replaced by a stochastic or probabilistic one in which the target distance is selected either randomly or with a probability that depends on the difference between the current distance and the two nearest range boundaries. In the example described above (d5 in FIG. 1), a probabilistic choice between 2 and 3 as a target distance could be made, with probabilities of, for example, 0.1 and 0.9, respectively (that is, 2 could be selected as the target distance with probability 0.1, and 3 with probability 0.9). Any method for deriving such probabilities can be used. Alternatively, either 2 or 3 could be chosen as the target distance at random.

For example, bounded uncertainties in the pairwise relationships may represent stochastic or systematic errors or noise associated with a physical measurement, and can, in general, differ from one pairwise relationship to another. A typical example are the Nuclear Overhauser Effects (NOE's) in multidimensional Nuclear Magnetic Resonance spectrometry. Alternatively, the uncertainty may result from multiple measurements of a given relationship.

An alternative algorithm for dealing with uncertainties is to reduce the magnitude of the correction for pairs of objects whose relationship is thought to be uncertain. In this scheme, the magnitude of the correction, as determined by the learning rate in Eq. 8, for example, is reduced for pairwise relationships which are thought to be uncertain. The magnitude of the correction may depend on the degree of uncertainty associated with the corresponding pairwise relationship (for example, the magnitude of the correction may be inversely proportional to the uncertainty associated with the corresponding pairwise relationship). If the existence and/or magnitude of the errors is unknown, then the errors can be determined automatically by the algorithm.

4. Pairwise Relationship Matrices with Unbounded Uncertainties

The ideas described in the preceding Sections can be applied when some of the pairwise relationships are thought to contain corrupt data, that is when some of the pairwise relationships are incorrect and bear essentially no relationship to the actual values. In this case, "problematic" relationships can be detected during the course of the algorithm, and removed from subsequent processing. In other words, the objective is to identify the corrupt entries and remove them from the relationship matrix. This process results in a sparse relationship matrix, which can be refined using the algorithm in Section 2.a above.

5. Modifications of the Basic Algorithm

In many cases, the algorithm described above may be accelerated by pre-ordering the data using a suitable statistical method. For example, if the proximities are derived from data that is available in vectorial or binary form, the initial configuration of the points on the nonlinear map may be computed using principal component analysis. In a preferred embodiment, the initial configuration may be constructed from the first m principal components of the feature matrix (i.e. the m latent variables which account for most of the variance in the data). This technique can have a profound impact on the speed of refinement. Indeed, if a random initial configuration is used, a significant portion of the training time is spent establishing the general structure and topology of the nonlinear map, which is typically characterized by large rearrangements. If, on the other hand, the input configuration is partially ordered, the error criterion can be reduced relatively rapidly to an acceptable level.

If the data is highly clustered, by virtue of the sampling process low-density areas may be refined less effectively than high-density areas. In one embodiment, this tendency may be partially compensated by a modification to the original algorithm, which increases the sampling probability in low-density areas. This type of biased sampling may be followed with regular, unbiased sampling, and this process may be repeated any number of times in any desired sequence.

Generally, the basic algorithm does not distinguish weak from strong relationships (short-range and long-range distances, respectively). One method to ensure that strong relationships are preserved more faithfully than weak relationships is to weight the coordinate update in EQ. 5 (or, equivalently, the learning rate λ in EQ. 7 and 8) by a scaling factor that is inversely proportional to the strength (magnitude) of the relationship An alternative (and complementary) approach is to ensure that objects at close separation are sampled more extensively than objects at long separation. For example, an alternating sequence of global and local refinement cycles, similar to the one described above, can be employed. In this embodiment, a phase of global refinement is initially carried out, after which, the resulting nonlinear map is partitioned into a regular grid. The points (objects) in each cell of the grid are then subjected to a phase of local refinement (i.e. only objects from within the same cell are compared and refined). Preferably, the number of sampling steps in each cell should be proportional to the number of objects contained in that cell. This process is highly parallelizable. This local refinement phase is then followed by another global refinement phase, and the process is repeated for a prescribed number of cycles, or until the embedding error is minimized within a prescribed tolerance. Alternatively, the grid method may be replaced by another suitable method for identifying proximal points, such as clustering, for example.

The methods described herein may be used for incremental mapping. That is, starting from an organized nonlinear map of a set of objects, a new set of objects may be added without modification of the original map. In an exemplary embodiment, the new set of objects may be "diffused" into the existing map, using a modification of the basic algorithm described above. In particular, Eq. 5 and 6 can be used to update only the additional objects. In addition, the sampling procedure ensures that the selected pairs contain at least one object from the new set. That is, two objects are selected at random so that at least one of these objects belongs to the new set. Alternatively, each new object may be added independently using the approach described above.

II. Method

A. Nonlinear Mapping Networks—Algorithm I

The process described herein uses the iterative nonlinear mapping algorithm described in Section II to multidimensionally scale a small random sample of a set of input patterns of dimensionality n, and then "learns" the underlying nonlinear transform using an artificial neural network. For a nonlinear projection from n to m dimensions, a simple 3-layer network with n input and m output units can be employed. The network is trained to reproduce the input/output coordinates produced by the iterative algorithm, and thus encodes the mapping in its synaptic parameters in a compact, analytical manner. Once trained, the neural network can be used in a feed-forward fashion to project the remaining members of the input set, as well as new, unseen samples with minimal distortion.

Figure 2:
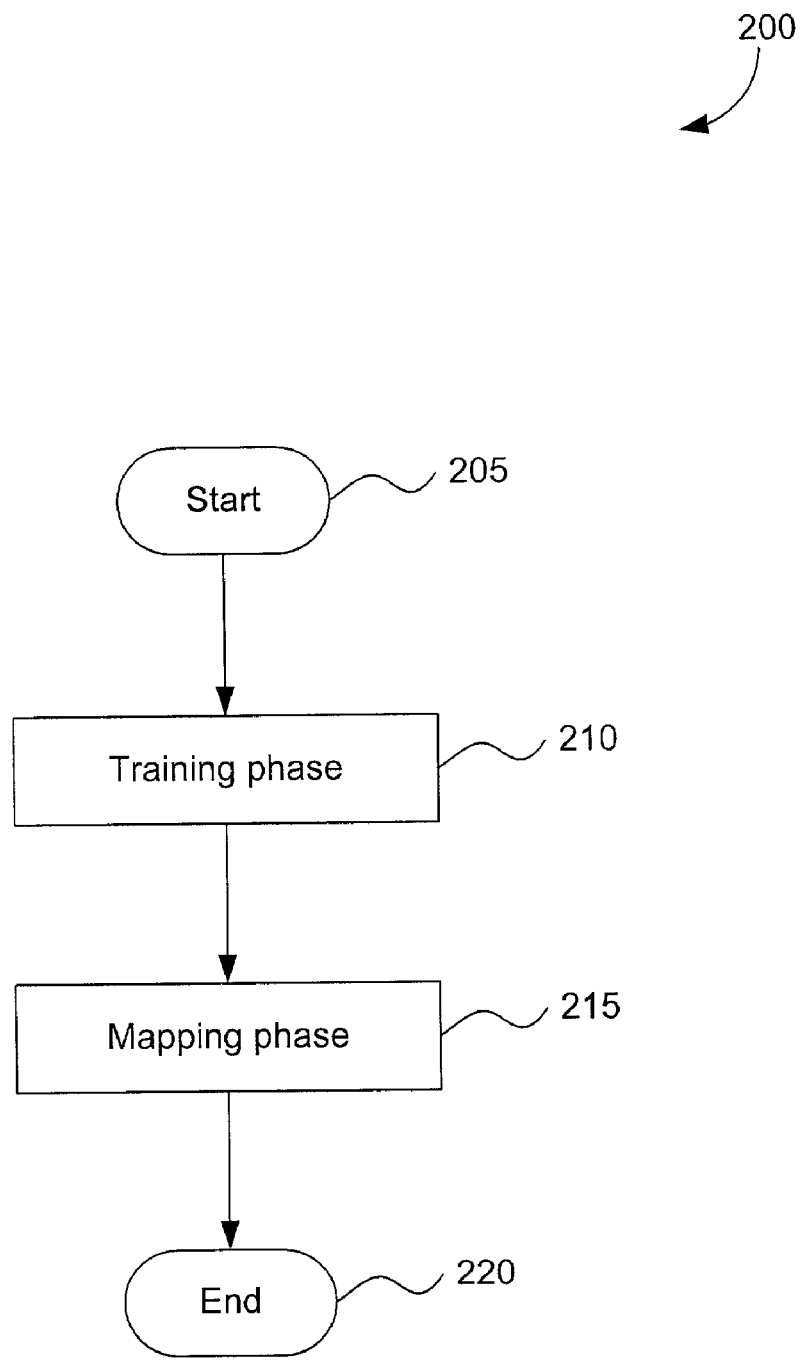
FIG. 2 is a flowchart illustrating the phases of the method of the invention.

The method of the invention is illustrated generally in FIG. 2. The method begins at step 205. In step 210, the training of a neural network takes place, where the training is based on the results (i.e., the inputs and outputs) of the iterative algorithm. In step 215, points in $R^n$ are projected into $R^m$ by a feed-forward pass through the trained neural network The process concludes with step 220.

B. Local Nonlinear Mapping Networks—Algorithm II

The embodiment of the invention described in this section represents a variation of the above algorithm. This approach is based on local learning. Instead of using a single "global" network to perform the nonlinear mapping across the entire input data space $R^n$, this embodiment partitions the space into a set of Voronoi polyhedra, and uses a separate "local" network to project the patterns in each partition. Given a set of reference points $P=\{P_1, P_2, \ldots\}$ in $R^n$, a Voronoi polyhedron (or Voronoi cell), v(p), is a convex polytope associated with each reference point p which contains all the points in $R^n$ that are closer to p than any other point in P:

$$v(p)=\{x\in R^n | d(x,p)\leq d(x,q) \forall p,q\in P, p\neq q\} \quad (11)$$

where d( ) is a distance function. In an embodiment of the invention, d( ) is the Euclidean distance function. Voronoi cells partition the input data space $R^n$ into local regions "centered" at the reference points P, also referred to as centroids. Hereafter, the local networks associated with each Voronoi cell are said to be centered at the points P, and the distance of a point in $R^n$ from a local network will refer to the distance of that point from the network's center.

The training phase involves the following general steps: a training set is extracted from the set of input patterns and mapped using the iterative nonlinear mapping algorithm described in Section II. A set of reference points in the input space $R^n$ is then selected, and the objects comprising the training set are partitioned into disjoint sets containing the patterns falling within the respective Voronoi cells. Patterns that lie on the sides and vertices of the Voronoi cells (i.e. are equidistant to two or more points in P), are arbitrarily assigned to one of the cells. A local network is then assigned to each cell, and is trained to reproduce the input/output mapping of the input patterns in that cell. While the direct nonlinear map is obtained globally, the networks are trained locally using only the input patterns within their respective Voronoi partitions. Again, simple 3-layer perceptrons with n input and m output units can be employed, where n and m are the dimensionalities of the input and output spaces, respectively.

Figure 3:
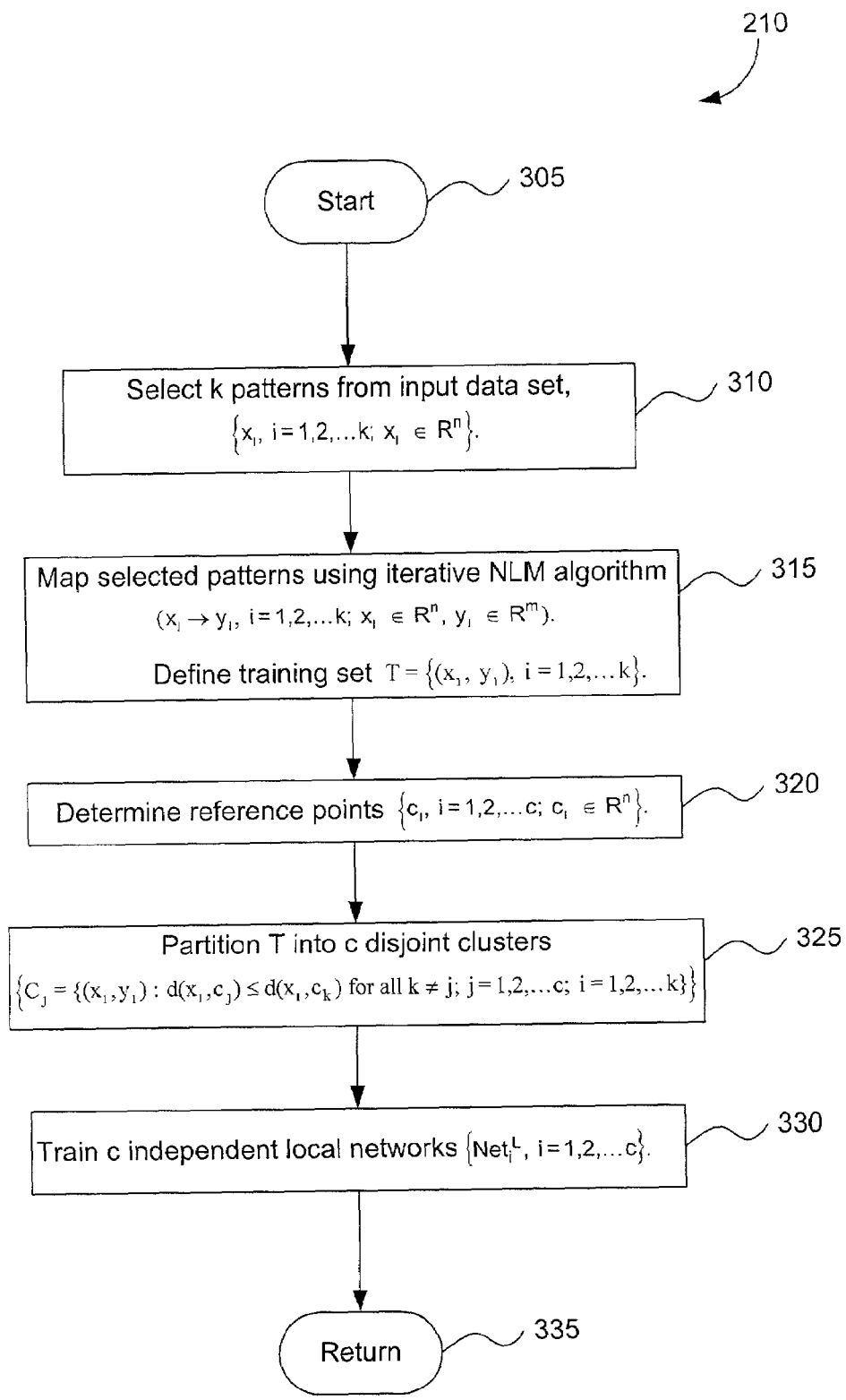
FIG. 3 is a flowchart illustrating the training phase of the invention, according to an embodiment.

The training phase of the method of the invention therefore involves the following steps as illustrated in FIG. 3. The training phase begins at step 305. In step 310, a random set of points $\{x_i, i=1,2, \ldots, k; x_i \in R^n\}$ is extracted from the set of input patterns. In step 315, the points $x_i$ are mapped from $R^n$ to $R^m$ using the iterative nonlinear mapping algorithm described in Section II ($x_i \to y_i$, $i=1,2, \ldots, k$, $x_i \in R^m$). This mapping serves to define a training set T of ordered pairs $(x_i, y_i)$, $T=\{(x_i, y_i), i=1,2, \ldots, k\}$.

In step 320, a set of reference points $P=\{c_1, i=1,2, \ldots c; c_1 \in R^n\}$ is determined. In an embodiment of the invention, the reference points $c_i$ are determined using a clustering algorithm described in greater detail below. In step 325, the training set T is partitioned into c disjoint clusters based on the distance of each point $x_i$ from each reference point. The set of disjoint clusters is denoted $\{C_j=\{(x_j, y_i): d(x_i, c_j) \leq d(x_i, c_k)\}$ for all $k \neq j; j=1,2, \ldots, c; i=1,2, \ldots, k\}$. In step 330, c independent local networks $\{Net_i^L, i=1,2, \ldots, c\}$ are trained with the respective training subsets $C_i$ derived in step 325. The training phase concludes with step 335.

Clearly, an important choice to be made concerns the partitioning. In general, the reference points $c_i$ (determined in step 320) should be well distributed and should produce balanced partitions that contain a comparable number of training patterns. This is necessary in order to avoid the creation of poorly optimized networks due to an insufficient number of training cases. In one embodiment, described here, the reference points $c_i$ can be determined using the fuzzy clustering means (FCM) algorithm (Bezdek, J. C., Pattern Recognition with Fuzzy Objective Function Algorithms. Plenum Press, 1981). The FCM algorithm uses the probabilistic constraint that the sum of the memberships of a data point over all clusters must be equal to 1, and has been most successful in situations where the final objective is a crisp decision, as is the case in the problem at hand.

The FCM algorithm attempts to minimize the objective function:

$$J_q = \sum_{j=1}^{C} \sum_{i=1}^{N} m_{ij}^q d^2(x_i, c_j) \qquad (12)$$

over a set of points $x_i$, $i=1,2, \ldots, N$, with respect to the fuzzy degrees of membership $m_{ij}$, the "fuzziness" index q, and the cluster centroids $c_j$, $j=1, 2, \ldots C$, where C is the total number of clusters, and $m_{ij}$ is the degree of membership of the i-th pattern to the j-th cluster. In addition, the solution must satisfy the constraints that the membership value of each pattern in any given cluster must be less than or equal to one:

$$0 \leq m_{ij} \leq 1 \qquad (13)$$

and the sum of its membership values over all clusters must be equal to 1:

$$\sum_{j=1}^{C} m_{ij} = 1 \qquad (14)$$

In an embodiment of the invention, the squared distance $d^2(x_i, c_j)$ is the Euclidean distance between the i-th point in $R^n$ and the j-th reference point. Equations 13 and 14 ensure that the solutions to Eq. 6 represent true fuzzy partitions of the data set among all the specified classes. In the above equation, $q \in [1\infty)$ is a weighting exponent known as the "fuzziness index" or "fuzzifier" that controls the degree of fuzziness of the resulting clusters. For q=1 the partitions are crisp, and as $q \to \infty$ the clusters become increasingly fuzzy.

Figure 4:
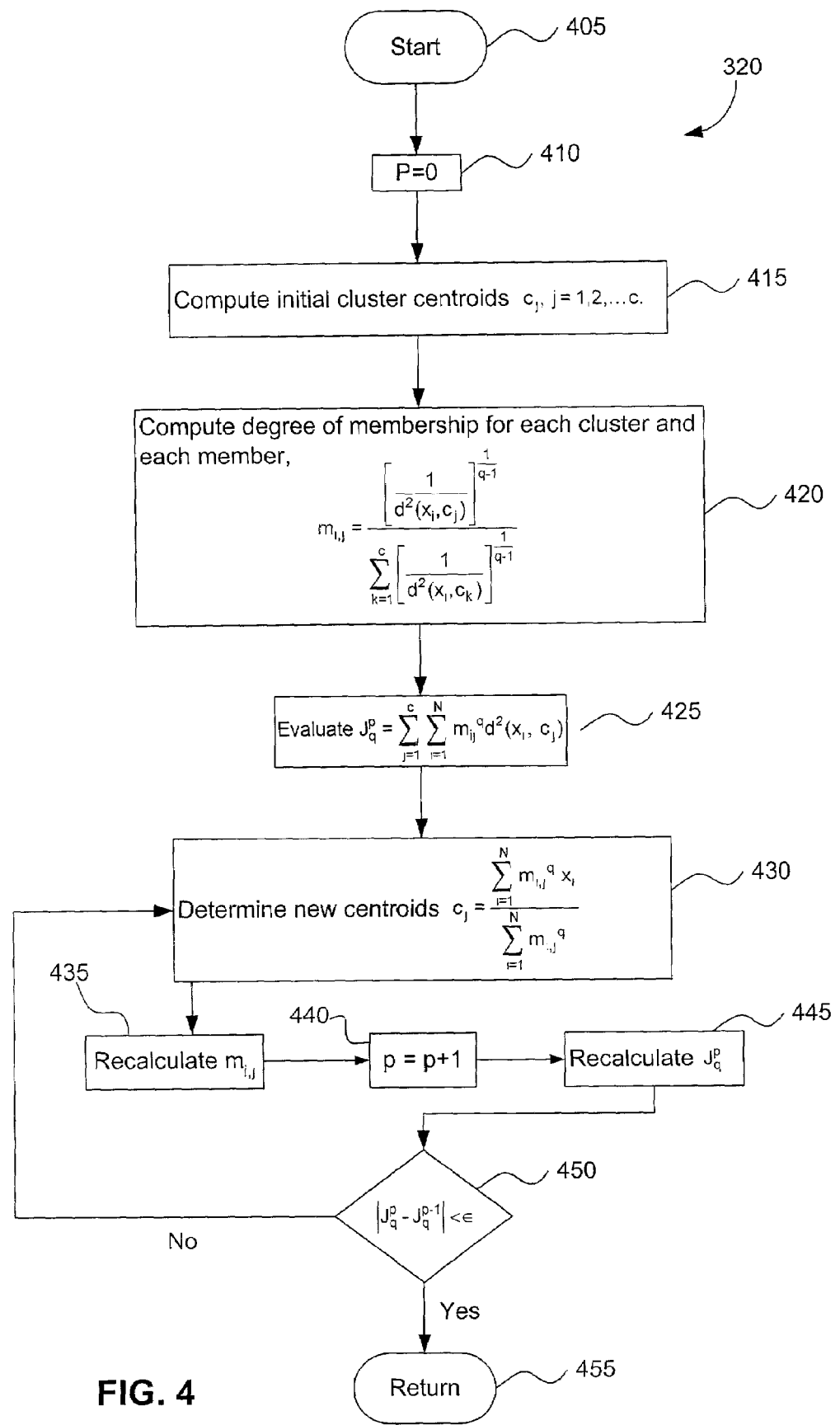
FIG. 4 is a flowchart illustrating the use of a fuzzy clustering methodology in the selection of reference patterns, according to an embodiment of the invention.

The determination of reference points $c_j$, $j=1,2, \ldots, C$ using FCM is illustrated in FIG. 4, according to an embodiment of the invention. The process starts with step 405. In step 410, an iteration counter p is initialized. In step 415, an initial choice for the cluster centroids $\{c_j, j=1,2, \ldots, C\}$ is made. Given this choice for $\{c_j\}$, in step 420 the degree of membership of each point $x_i$ in each cluster is calculated using the following formula:

$$m_{ij} = \frac{\left[\frac{1}{d^2(x_i, c_j)}\right]^{\frac{1}{q-1}}}{\sum_{k=1}^{C}\left[\frac{1}{d^2(x_i, c_k)}\right]^{\frac{1}{q-1}}} \qquad (15)$$

In step 425, the objective function $J_q^p$ is evaluated using Eq. 16:

$$J_q^p = \sum_{j=1}^{C} \sum_{i=1}^{N} m_{ij}^q d^2(x_i, c_j) \qquad (16)$$

In step 430, new centroids $c_j$ are computed using the formula:

$$c_j = \frac{\sum_{i=1}^{N} m_{ij}^q x_i}{\sum_{i=1}^{N} m_{ij}^q} \qquad (17)$$

In step 435, $m_{ij}$ are recalculated using the new centroids and Eq. 15. In step 440, the iteration counter p is incremented. In step 445, $J_q^p$ is recalculated in light of the new $m_{ij}$ determined in step 435.

In step 450, the difference between $J_q^p$ and its predecessor value $J_q^{p-1}$ is determined. If the difference is sufficiently small, as indicated in the inequality $|J_q^1 - J_q^0| > \epsilon$, where $\epsilon$ is a small positive constant (here $\epsilon = 0.0009$), then the process concludes at step 455, and the most recently determined $\{c_j\}$ is used as the set of reference points for partitioning purposes. Otherwise, another set of centroids is determined in step 430. The process will continue until the condition of step 450 is satisfied.

Figure 5:
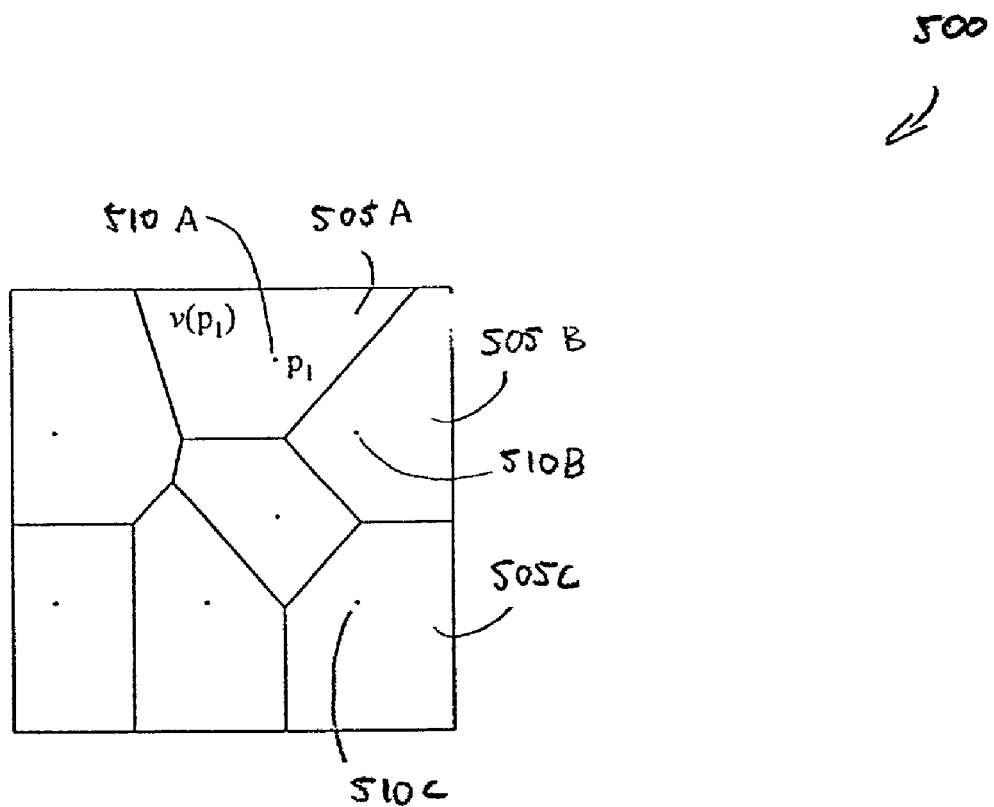
FIG. 5 illustrates the concept of Voronoi cells, as used in an embodiment of the invention.

Once the convergence criterion in step 450 has been met, the new centroids computed by Eq. 17 are used to partition the input data set into a set of Voronoi cells. Such cells are illustrated in FIG. 5. A set 500 is shown partitioned into Voronoi cells, such as cells 505A through 505C. The Voronoi cells include centroids 510A through 510C respectively.

Figure 6:
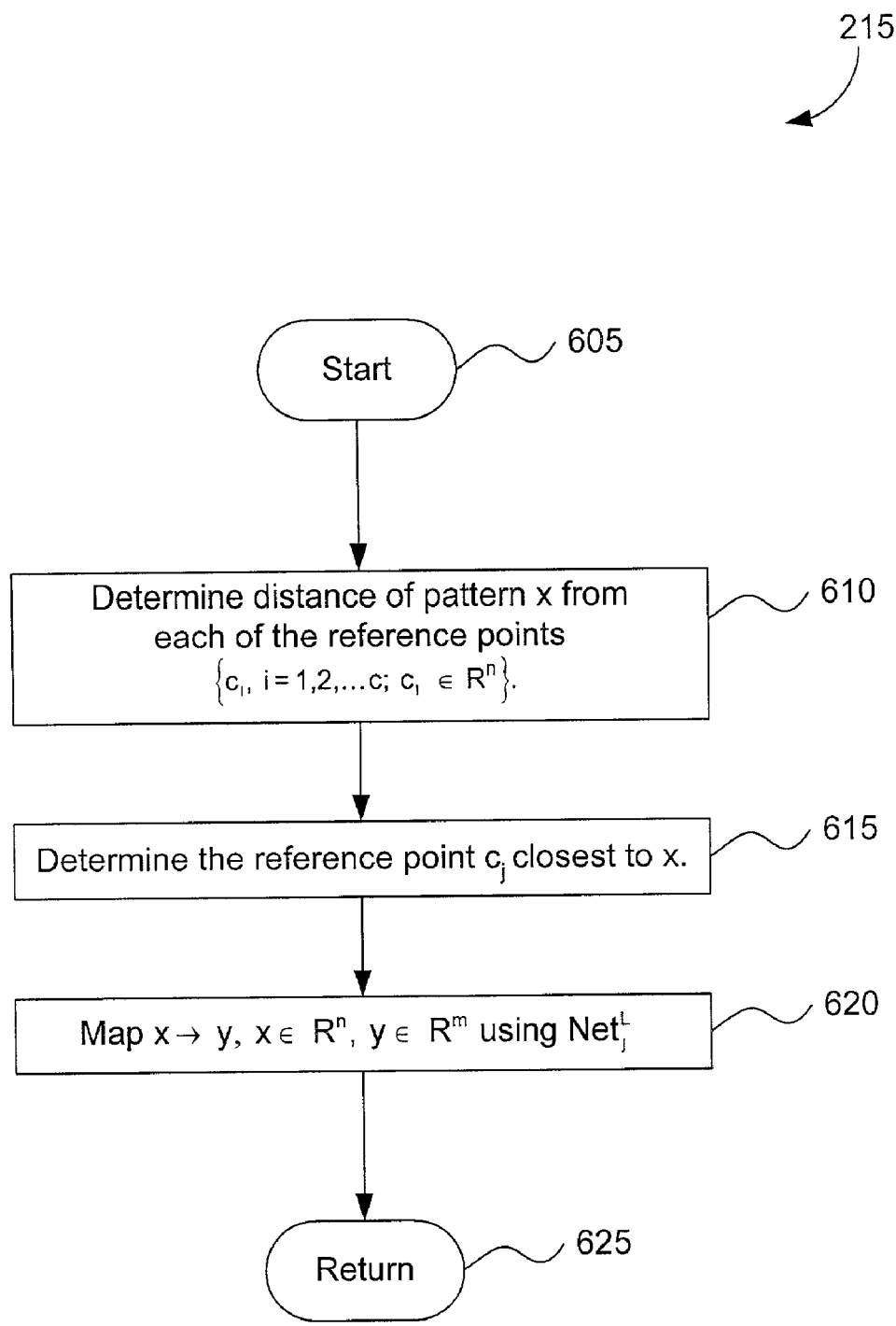
FIG. 6 is a flowchart illustrating the projection of input patterns, according to an embodiment of the invention.

Once all the local networks are trained, additional patterns from the input set of patterns can be mapped into $R^m$ as illustrated in FIG.6. The process begins with step 605. In step 610, the distance of the input pattern x to each reference point in $\{c_i, i=1,2, \ldots c; c_i \in R^n\}$ is determined. In step 615, the point $c_j$ that is nearest to the input pattern $x_i$s identified. In step 620, the pattern x is mapped to a point y in $R^m$, $x \rightarrow y$, $x \in R^n$, $y \in R^m$ using the local neural network $Net_j^L$ associated with the reference point $c_j$ identified in step 615. The process concludes with step 625.

Figure 7:
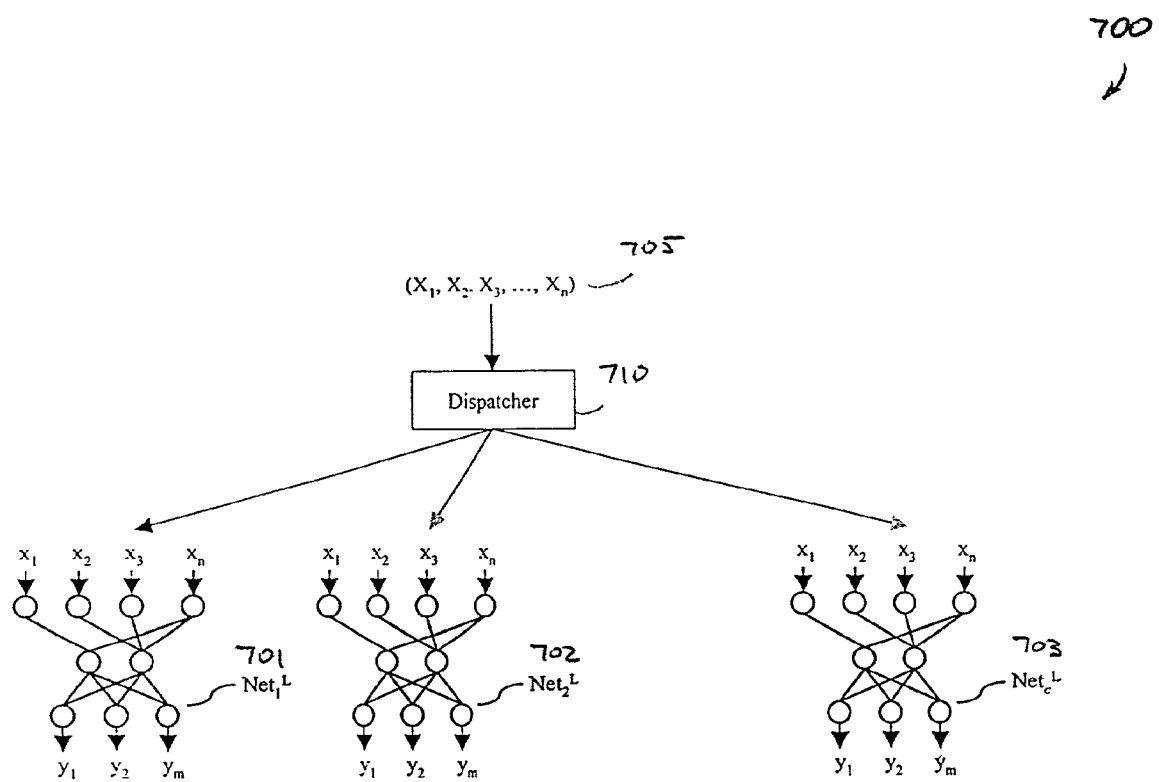
FIG. 7 illustrates the operation of local neural networks, according to an embodiment of the invention.

Note that new patterns in $R^n$ that not in the original input set can also be projected into $R^m$ in the manner shown in FIG. 6. Once the system is trained, new patterns in $R^n$ are mapped by identifying the nearest local network and using that network in a feed-forward manner to perform the projection. An embodiment of a system that does this is illustrated in FIG. 7. The input for the system is a pattern 705 in $R^n$. This point is defined by its n attributes, $(x_1, x_2, \ldots x_n)$. The system includes a dispatcher module 710, which compares the distance of the input point to the network centers (i.e., the reference points), and forwards the input point to one of the available local neural networks 701, 702, or 703. Specifically, the input pattern is sent to the local neural network associated with the reference point nearest to the input pattern. The chosen network then performs the final projection, resulting in an output point in $R^m$.

C. Local Nonlinear Mapping Networks—Algorithm III

The ability of a single network to reproduce the general structure of the nonlinear map suggests an alternative embodiment to overcome some of the complexities of clustering in higher dimensions. Conceptually, the alternative embodiment differs from Algorithm II in the way it partitions the data space. In contrast to the previous method, this process partitions the output space, and clusters the training patterns based on their proximity on the m-dimensional nonlinear map rather than their proximity in the n-dimensional input space. For the training set, the assignment to a partition is straightforward. The images of the points in the training set on the nonlinear map are derived directly from the iterative algorithm described in Section II. For new points that are not part of the training set, the assignment is based on approximate positions derived from a global neural network trained with the entire training set, like the one described in section II. A. The general flow of the algorithm is similar to the one described in section II. B.

Figure 8:
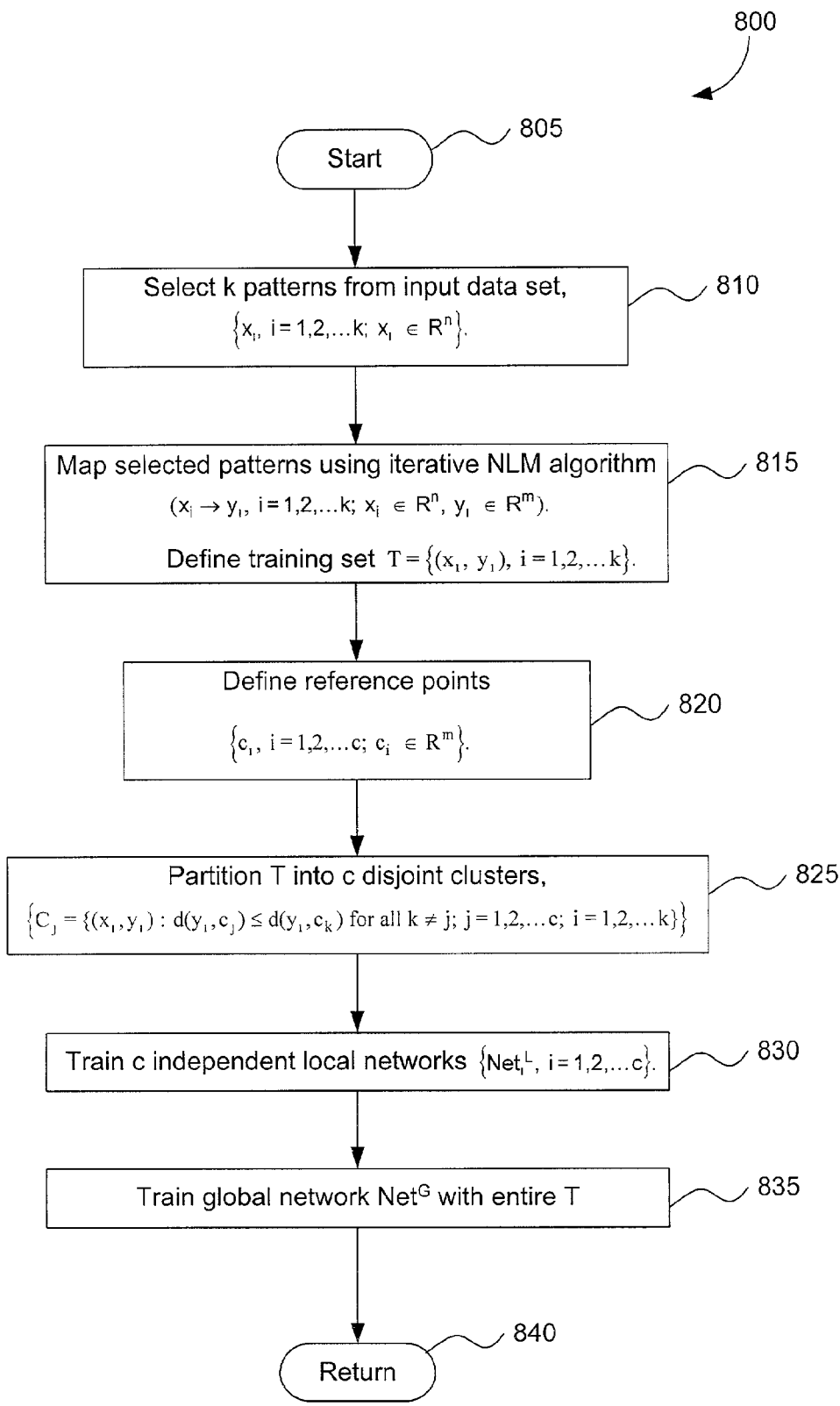
FIG. 8 is a flowchart illustrating the training phase of the invention, according to an alternative embodiment.

The training phase for this embodiment is illustrated in FIG. 8. The method begins at step 805. In step 810, a random set of patterns $\{x_i, i=1,2, \ldots, k; x_i \in R^n\}$ is extracted from the input data set. In step 815, the patterns $x_i$ are mapped from $R^n$ to $R^m$ using the iterative nonlinear mapping algorithm described in section I B ($x_i \rightarrow y_i, i=1,2, \ldots, k, x_i \in R^n, y_i \in R^m$). This mapping serves to define a training set T of ordered pairs $(x_i, y_i)$, $T=\{(x_i, y_i), i=1,2, \ldots, K\}$.

In step 820, the points $\{y_i, i=1,2, \ldots, k, y_i \in R^m\}$ are clustered into c clusters associated with c points in $R^m$, $\{c_i, i=1,2, \ldots c; c_i \in R^m\}$. In the illustrated embodiment, fuzzy clusters are formed in this step using the FCM algorithm of FIG. 4. In step 825, the training set T is partitioned into c disjoint clusters $C_j$ based on the distance of the images $y_i$ from the cluster prototypes, $\{C_j = \{(x_i, y_i): d(y_i, c_j) \leq d(y_i, c_k)\}$ for all $k \neq j$; $j=1,2, \ldots, c$; $i=1,2, \ldots, k\}\}$. In step 830, c independent local neural networks $\{Net_i^L, i=1,2, \ldots, c\}$ are trained with the respective clusters $C_j$ derived in step 825. In step 835, a global network $Net^G$ is trained with the entire training set T. The process concludes with step 840.

Figure 9:
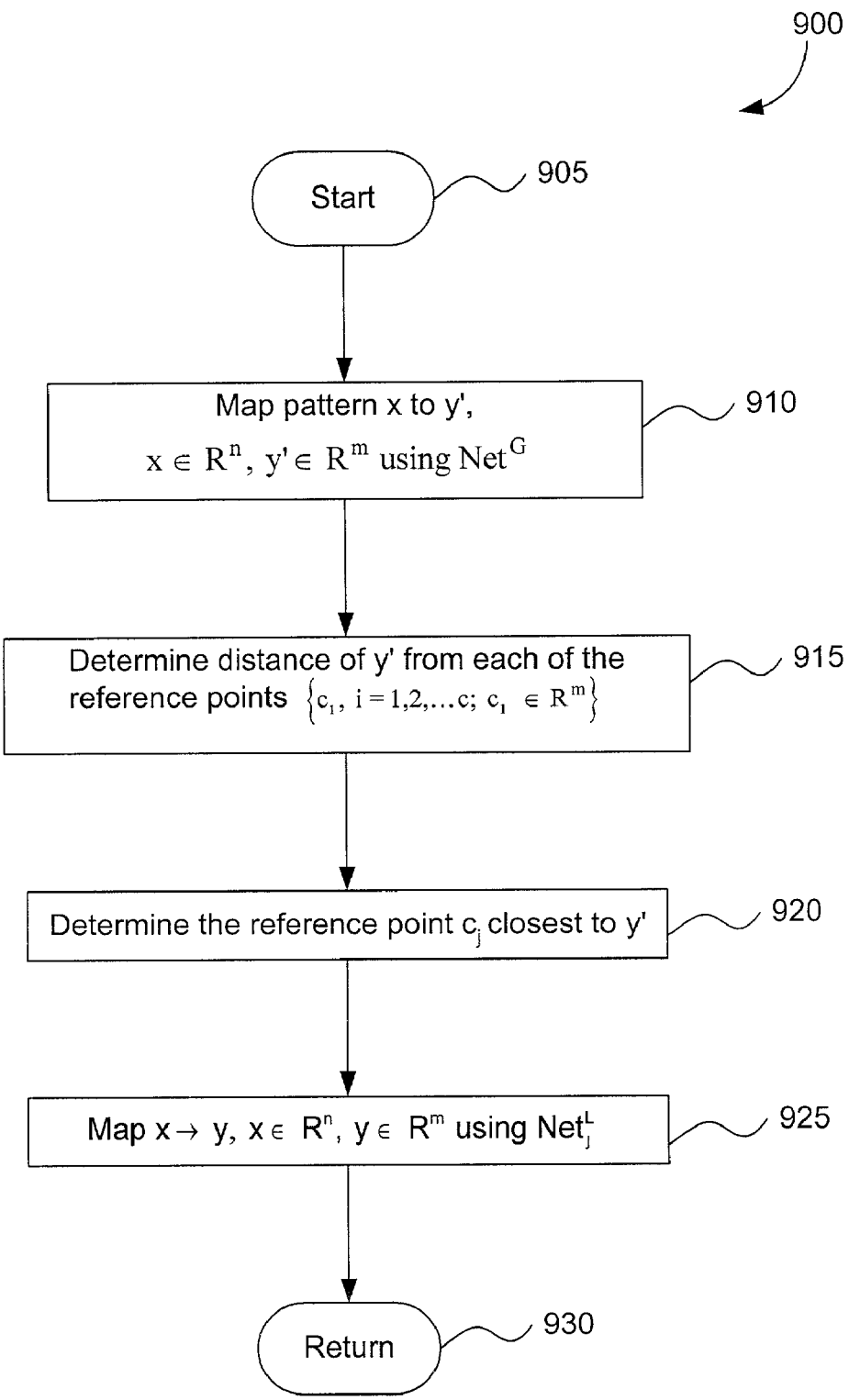
FIG. 9 is a flowchart illustrating the projection of input patterns, according to an alternative embodiment of the invention.

Once all the networks are trained, remaining input patterns from the input data set and any new patterns in $R^n$ are projected using a tandem approach. An embodiment of this is illustrated in FIG. 9. The projection process begins at step 905. In step 910, each input pattern x to be projected into $R^m$ is mapped, $x \rightarrow y'$, $x \in R^n$, $y' \in R^m$, using the global network $Net^G$ derived in step 835.

In step 915, the distance from y' to each reference point $c_i$ in $\{c_i, i=1,2, \ldots c; c_i \in R^m\}$ is determined. In step 920, the point $c_j$ closest to y' is determined. In step 925, x is mapped into $R^m$, $x \rightarrow y$, using the local neural network associated with $c_j$, $Net_j^L$. The process ends with step 930.

Figure 10:
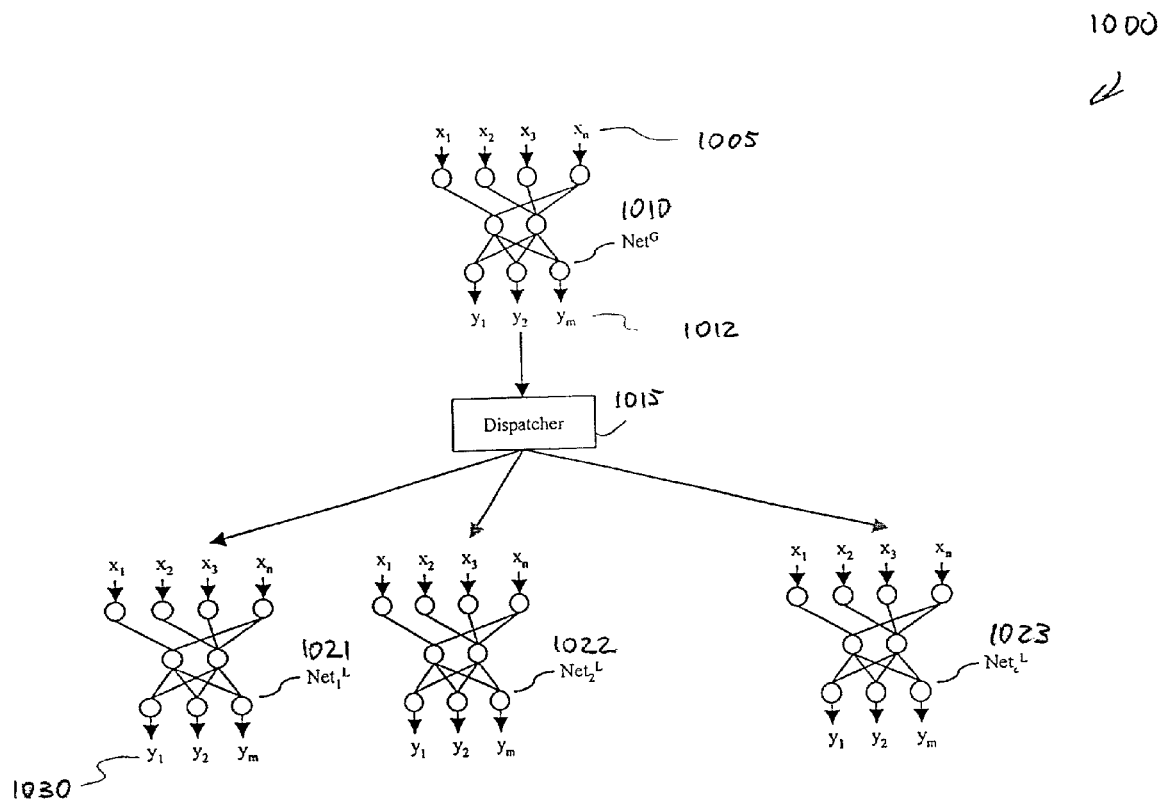
FIG. 10 illustrates the operation of global and local neural networks, according to an alternative embodiment of the invention.

A system for performing the overall mapping $x \rightarrow y$ is shown in FIG. 10. First, an input pattern 1005 $\in R^n$ is projected by the global network 1010, $Net^G$, to obtain point 1012 (y') $\in R^m$. Point y' can be viewed as having approximate coordinates on the nonlinear map. These coordinates are used to identify the nearest local network 1021 ($Net_j^L$) from among the possible local neural networks 1021 through 1023, based on the proximity of y' to each $c_i$. Input point 1005 is projected once again, this time by the nearest local network 1021 to produce the final image 1030 on the display map.

III. Environment

Figure 11:
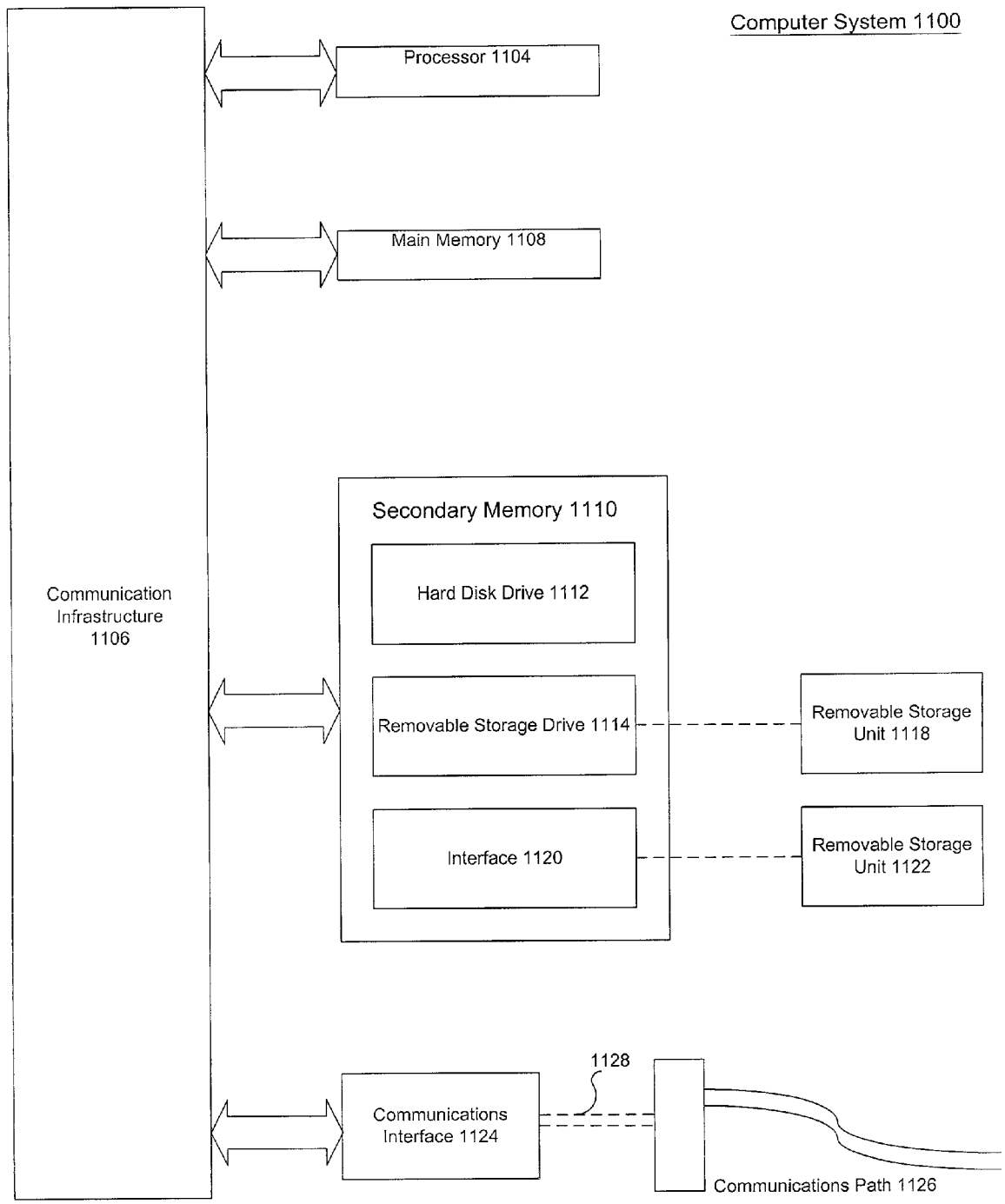
FIG. 11 illustrates a computing environment within which the invention can operate.

The present invention may be implemented using hardware, software or a combination thereof and may be implemented in a computer system or other processing system. An example of such a computer system 1100 is shown in FIG. 11. The computer system 1000 includes one or more processors, such as processor 1104. The processor 1104 is connected to a communication infrastructure 1106 (e.g., a bus or network). Various software embodiments can be described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. As will be appreciated, the removable storage unit 1118 includes a computer usable storage medium having stored therein computer software and/or data. In an embodiment of the invention, removable storage unit 1118 can contain input data to be projected.

Secondary memory 1110 can also include other similar means for allowing computer programs or input data to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels. In an embodiment of the invention, signals 1128 can include input data to be projected.

In this document, the terms "computer program medium" and "computer usable medium" are used to generally refer to media such as removable storage drive 1114, a hard disk installed in hard disk drive 1112, and signals 1128. These computer program products are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software for performing the training and projection phases of the invention may be stored in a computer program product and loaded into computer system 1100 using removable storage drive 1114, hard drive 1112 or communications interface 1124.

In another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above described exemplary embodiments, but should be defined only in accordance with the following claims and their equivalents.

What is claimed is:

1. A method of mapping a set of n-dimensional input patterns to an m-dimensional space for display of said patterns using locally defined neural networks, comprising the steps of:

(a) creating a set of locally defined neural networks trained according to a mapping of a subset of the n-dimensional input patterns into an m-dimensional output space; and
(b) mapping additional n-dimensional input patterns using the locally defined neural networks wherein step (a) comprises the steps of:
(i) selecting k patterns from the subset of n-dimensional input patterns, $\{x_i, i=1, 2, \ldots k, x_i \in R^n\}$;
(ii) mapping the patterns $\{x_i\}$ into an m-dimensional space $(x_i \rightarrow y_i, i=1, 2, \ldots k, y_i \in R^m)$, to form a training set $T=\{(x_i, y_i), i=1, 2, \ldots k\}$;
(iii) determining c n-dimensional reference points, $\{(c_i; i=1, 2, \ldots c, c_i \in R^n\}$;
(iv) partitioning T into c disjoint clusters $C_j$ based on a distance function d, $\{C_j=\{(x_i, y_i): d(x_i, y_j) \leq d(x_i, c_k)$ for all $k \neq j; j=1, 2, \ldots c; i=1, 2, \ldots k\}$; and
(v) training c independent local networks $\{Net_i^L, i=1,2, \ldots c\}$, with respective pattern subsets $C_i$.

2. The method of claim 1, wherein said step (iii) is performed using a clustering methodology.

3. The method of claim 1, wherein said step (b) comprises the steps of:
(i) for an additional n-dimensional input pattern $x \in R^n$, determining the distance to each reference point in $\{c_i\}$;
(ii) identifying a reference point $c_j$ closest to the input pattern x; and
(iii) mapping $x \rightarrow y$, $y \in R^m$, using the local neural network $Net_i^L$ associated with the reference point $c_j$ identified in step (ii).

4. A method of mapping a set of n-dimensional input patterns to an m-dimensional space for display of said patterns using locally defined neural networks, comprising the steps of:
(a) creating a set of locally defined neural networks trained according to a mapping of a subset of the n-dimensional input patterns into an m-dimensional output space; and
(b) mapping additional n-dimensional input patterns using the locally defined neural networks wherein step (a) comprises the steps of:
(i) selecting k patterns of the set of n-dimensional input patterns, $\{x_i, i=1, 2, \ldots k, x_i \in R^n\}$;
(ii) mapping the patterns $\{x_i\}$ into an m-dimensional space, $(x_i \rightarrow y_i, i=1, 2, \ldots k, y_i \in R^m)$, to form a training set $T=\{(x_i, y_i), i=1, 2, \ldots k\}$;
(iii) determining c m-dimensional reference points, $\{c_i, i=1, 2, \ldots c, c_i \in R^m\}$;
(iv) partitioning T into c disjoint clusters $C_j$ based on a distance function d, $\{C_j=\{(x_i, y_i): d(y_i, c_j) \leq d(y_i, c_k)$ for all $k \neq j, j=1, 2, \ldots c; i=1, 2, \ldots k)\}$;
(v) training c independent local networks $\{Net_i^L, i=1, 2, \ldots c\}$, with respective pattern subsets $C_i$; and
(vi) training a global network $Net^G$ using all the patterns in T.

5. The method of claim 4, wherein said step (iii) is performed using a clustering methodology.

6. The method of claim 4, wherein step (b) comprises the steps of:
(i) for an additional n-dimensional pattern $x \in R^n$, mapping $x \rightarrow y'$, $y' \in R^m$, using $Net^G$;
(ii) determining the distance of y' to each reference point in $\{c_i\}$;
(iii) identifying a reference point $c_j$ closest to y'; and
(iv) mapping $x \rightarrow y$, $y \in R^m$, using the local neural network $Net_j^L$ associated with the reference point $c_j$ identified in step (iii).

7. A computer program product comprising a computer usable medium having computer readable program code means embodied in said medium for causing an application program to execute on a computer that maps a set of n-dimensional input patterns to an m-dimensional space for display of said patterns using locally defined neural networks, said computer readable program code means comprising:

a first computer readable program code means for causing the computer to create a set of locally defined neural networks trained according to a mapping of a subset of the n-dimensional input patterns into an m-dimensional space; and a second computer readable program code means for causing the computer to project additional n-dimensional patterns of the input set using the locally defined neural networks;

wherein said first computer readable code means comprises:

(i) computer readable program code means for selecting k patterns from the subset of n-dimensional input patterns, $\{x_i, i=1, 2, \ldots k, x_i \in R^n\}$;

(ii) computer readable program code means for mapping the patterns $\{x_i\}$ into an m-dimensional space $(x_i \rightarrow y_i, i=1, 2, \ldots k, y_i \in R^m)$, to form a training set $T=\{(x_i, y_i), i=1, 2, \ldots k\}$;

(iii) computer readable program code means for determining c n-dimensional reference points, $\{c_i, i=1, 2, \ldots c, c_i \in R^n\}$;

(iv) computer readable program code means for partitioning T into c disjoint clusters $C_j$ based on a distance function d, $\{C_j=\{(x_i, y_i): d(x_i, y_j) \leq d(x_i, c_k)$ for all $k \neq j$; $j=1, 2, \ldots c; i=1, 2, \ldots k\}$; and (v) computer readable program code means for training c independent local networks $\{Net_i^L, i=1, 2, \ldots c\}$, with respective pattern subsets $C_i$.

8. The computer program product of claim 7, wherein said first computer readable program code means uses a clustering methodology.

9. The computer program product of claim of claim 7, wherein said second computer readable code means comprises:

(i) for an additional n-dimensional input pattern $x \in R^n$, computer readable code means for determining the distance to each reference point in $\{c_i\}$;

(ii) computer readable program code means for identifying a reference point $c_j$ closest to the input pattern x; and (iii) computer readable program code means for mapping $x \rightarrow y$, $y \in R^m$, using the local neural network $Net_j^L$ associated with the reference point $c_j$ identified in step (ii).

10. A computer program product comprising a computer usable medium having computer readable program code means embodied in said medium for causing an application program to execute on a computer that maps a set of n-dimensional input patterns to an m-dimensional space for display of said patterns using locally defined neural networks, said computer readable program code means comprising:

a first computer readable program code means for causing the computer to create a set of locally defined neural networks trained according to a mapping of a subset of the n-dimensional input patterns on said m-dimensional space; and a second computer readable program code means for causing the computer to project additional n-dimensional patterns of the input set using the locally defined neural networks; wherein said first computer readable program code means comprises:

(i) computer readable program code means for selecting k patterns of the set of n-dimensional input patterns, $\{x_i, i=1, 2, \ldots k, x_i \in R^n\}$;

(ii) computer readable program code means for mapping the patterns $\{x_i\}$ into an m-dimensional space, $(x_i \rightarrow y_i, i=1, 2, \ldots k, y_i \in R^m)$, to form a training set $T=\{(x_i, y_i), i=1, 2, \ldots k\}$;

(iii) computer readable program code means for determining c m-dimensional reference points, $\{c_i, i=1, 2, \ldots c, c_i \in R^m\}$;

(iv) computer readable program code means for partitioning T into c disjoint clusters $C_j$ based on a distance function d, $\{C_j=\{(x_i, y_i): d(y_i, c_j) \leq d(y_i, c_k)$ for all $k \neq j$; $j=1, 2, \ldots c; i=1, 2, \ldots k)\}$;

(v) computer readable program code means for training c independent local networks $\{Net_i^L, i=1, 2, \ldots c\}$, with respective pattern subsets $C_i$; and (vi) computer readable program code means for training a global network $Net^G$ using all the patterns in T.

11. The computer program product of claim 10, wherein said first computer readable program code means uses a clustering methodology.

12. The computer program product of claim 10, wherein said second computer readable program code means comprises:

(i) for an additional n-dimensional pattern $x \in R^n$, computer readable program code means for mapping $x \rightarrow y'$, $y' \in R^m$, using $Net^G$;

(ii) computer readable program code means for determining the distance of y' to each reference point in $\{c_j\}$;

(iii) computer readable program code means for identifying a reference point $c_j$ closest to y'; and (iv) computer readable program code means for mapping $x \rightarrow y$, $y \in R^m$, using the local neural network $Net_j^L$ associated with the reference point $c_j$ identified in step (iii).

* * * * *